INVENTORS.
DONIVAN L. HALL
WILLIAM C. SUSOR
JAMES H. KUZARA
BY
Marshall, Wilson & Yeasting
attys- INVENTORS.
DONIVAN L. HALL
WILLIAM C. SUSOR
JAMES H. KUZARA
BY Marshall, Wilson & Yeasting
attys.

INVENTORS.
DONIVAN L. HALL
WILLIAM C. SUSOR
JAMES H. KUZARA
BY Marshall, Wilson & Yeasting
Att'ys

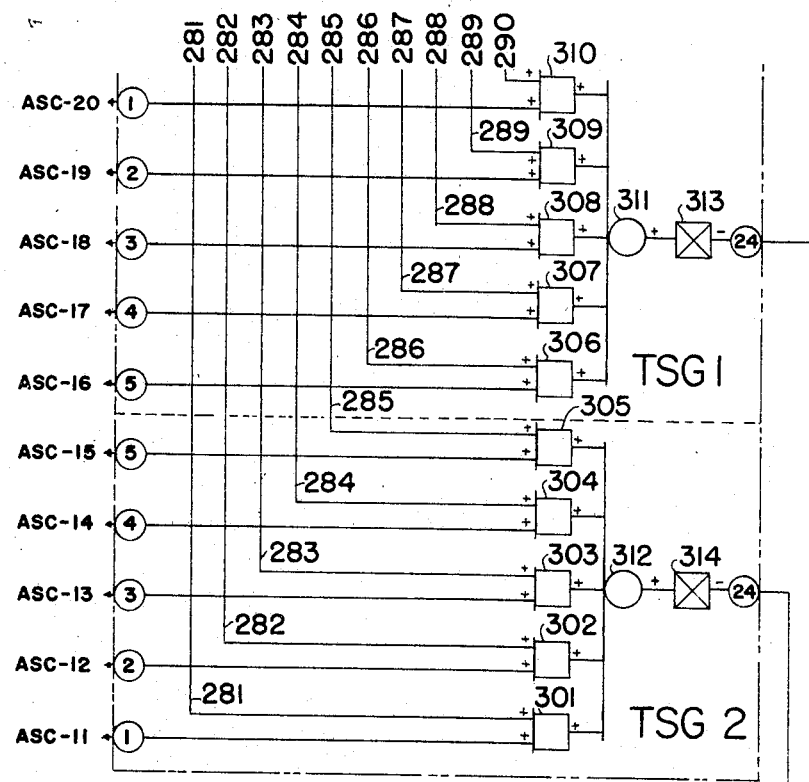
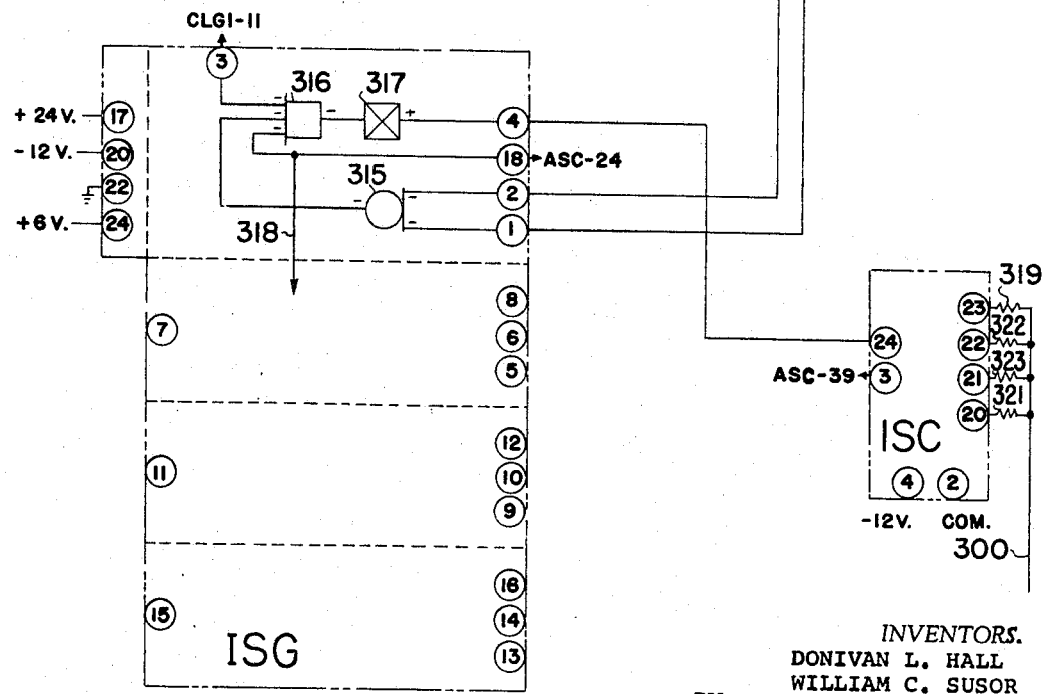
Fig. 7
INVENTORS.
DONIVAN L. HALL
WILLIAM C. SUSOR
JAMES H. KUZARA INVENTORS.
DONIVAN L. HALL
WILLIAM C. SUSOR
JAMES H. KUZARA
BY Marshall, Wilson & Yeasting
Attys

INVENTORS.
DONIVAN L. HALL
WILLIAM C. SUSOR
JAMES H. KUZARA

United States Patent Office 3,511,342
Patented May 12, 1970

3,511,342
ELEVATOR CONTROL FOR ASCERTAINING THE CAPABILITY OF CARS TO SERVE HALL CALLS
Donivan L. Hall, Toledo, William C. Susor, Oregon, and James A. Kuzara, Sylvania, Ohio, assignors, by mesne assignments, to The Reliance Electric and Engineering Company, Cleveland, Ohio, a corporation of Ohio
Filed Oct. 8, 1965, Ser. No. 494,194
Int. Cl. B66b 1/18
U.S. Cl. 187—29          44 Claims

ABSTRACT OF THE DISCLOSURE

A control system actuated by the presence of a hall call for elevators in a plural car system to evaluate the capability of a plurality of cars in the system to serve the hall call. The evaluating means considers a number of service criteria and their relationship between the floor of the hall call and the individual cars subject to the evaluation. Typical service capability citeria which are related to the call under consideration are the travel distance of each car to the selected call, the number of stops required of the car in traveling from its current position to the selected call, or if no calls are assigned to a car, the distance between the car and the selected call. Other service citeria include the total stops required of each car and the loading of each car. Analogue signals of these service capability criteria are generated as current which may be scaled to service time for the factors and may be summed to give a total service time of each car with respect to the call. One application of the system is to assign the hall call to the car having the optimum service capability with respect to the registered call.

---

This invention relates to elevator controls and more particularly to a control for developing an assignment between individual calls and individual cars and controlling those assignments in a plural car elevator system.

In United States patent application Ser. No. 493,973 filed herewith in the name of Donivan L. Hall and William C. Susor, entitled Elevator Controls an elevator system is set forth in which a plurality of cars serve a plurality of landings in response to car calls and landing calls. The system controls the cars in response to landing calls by predicting the ability of each of the cars to serve each of those calls individually and developing an assignment for service between each call and a car having an acceptable ability to serve the call. The landing calls are selected individually by a call finder so that the cars relationship thereto can be considered. Each call as it is selected is related to the cars and an attempt to develop an assignment with a car is undertaken before another call is considered. The service capabilities of the cars are ascertained and the assigning functions are performed in a call allotter.

The call allotter of the above Hall-Susor system considers each car serially in an order determined by the spacing of the cars from the selected call involved in the assignment. The closest car falling within acceptable limits of predicted service capability relative to the selected call is admitted into the assignment relationship with the call. Thus the car which is best situated to serve a call is not universally assigned the call since a car more distant from the call than the car subject to assignment can have a better capability to serve that call as where it is subject to less of a service requirement.

The Hall-Susor allotter based its determination on limits such that it does not consider the magnitudes of the service factors utilized to ascertain the car service capabilities. While several service factors are considered in the Hall-Susor allotter in establishing individual limits of acceptability for assignment, they have not been reduced to a common base and combined to produce a net level of acceptability.

In accordance with the above an object of the present invention is to improve the controls for plural car elevator systems.

Another object is to develop a service assignment between a call and that car having the optimum capability to serve the call.

Another object is to ascertain the service capabilities of a plurality of cars simultaneously.

A fourth object is to ascertain relative values between car location and a given location for a plurality of cars.

A fifth object is to develop a common basis for comparison of a plurality of service capability factors for an elevator. For example, to relate distance to be traveled, number of car calls assigned the car, number of landing calls assigned the car, and car loading to a common base as an analog electrical signal.

A sixth object is to sum the service capability factors for an elevator.

The above and additional objects are realized in this invention in one embodiment thereof by a system which develops an assignment between a call and that elevator car of a plurality of cars best disposed to serve the call. The system, termed an "allotter," ascertains the spacing of each car from a given landing, the landing of the call subject to assignment in the example, as a count of the number of landings each car will pass in traveling to the given landing. It develops an electrical signal level proportional to the count for each car. It also counts the number of car calls and landing calls having an assignment with each car and develops an electrical signal level proportional to that count for each car. The number of car calls and landing calls requiring stops of the car in its travel from its current position and state of service to the given landing is ascertained an electrical signal for each car. Loading of each car is also signified as an electrical signal proportioned to the loading.

The several signals are proportioned to service time represented by the factors monitored in the example. They are summed by suitable summing circuitry, for example, by drawing a given current from a common source for each second of service time represented. This produces a total current corresponding to a predicted service time. The total current for each car is converted to a voltage which is compared against a voltage signal which increases with time, termed a "ramp voltage," beginning from the completion of the evaluation of the individual service capability influencing factors considered. When coincidence in a sum voltage for a car and the ramp voltage is achieved, the car represented by that voltage is assigned the call which instituted operation of the allotter and the allotter is released for utilization with respect to another call.

One feature of this invention is the means for ascertaining distance between the given landing and the cars comprising a hunting device which advances step-by-step from the given landing around a circuit of landings encompassing all landings at which cars eligible to serve the given landing are located. Counters individual to the cars count the landing at which the respective car is effectively positioned.

A second feature involves ascertaining the travel distance the car will traverse in traveling to the given landing by terminating the count only when the sequence of advance of the hunting device is in a direction opposing the service direction of the car and the location of advance coincides with effective car location. Thus if the scan direction is downward and it coincides with a down car the count will continue. When the scan has advanced to its lower limit, reversed, and encountered the down car while scanning upward the count will terminate since that count will represent the continued down travel of the car and the up travel which will be required before it reaches the given landing.

A third feature involves ascertaining the absolute distance between a given landing and a car by counting the scan steps between the given landing and the car position only during scannig in a given direction. For example, if the scan cycles back to the given direction and the given landing is intermediate the landings of the limits of scan, absolute distance can be ascertained as the scan step count from the given landing to the car if the car-scan position coincidence occurs prior to the first reversal in scanned landing sequence or as the scan step count from the car-scan position coincidence to the given landing if that coincidence occurs subsequent to the second reversal in scanned landing sequence.

Another feature resides in sensing and counting for each car the coincidence of scan positions with the landings for which car calls and landing calls are registered which are assigned to the car. When such count is restricted to those coincidences sensed prior to the coincedence of the scan with the effective car position, it represents the stops required of the car prior to its arrival at the given landing. This is a significant factor in predicting the time required for each car to travel to the given landing.

A fifth feature comprises a means for counting all stops assigned a car, as both car and landing calls, throughout the car's range of travel.

A sixth feature involves accumulating information serially as by means of counters for each factor to be considered. Such serial accumulation is clocked with the scan of landing positions and has been illustrated for car spacing from the given landing and intermediate stops.

A seventh feature resides in means for the broadside developing of useful signals whereby at a suitable instant in the allotter function a plurality of bits of information is gated into a signal translating means. Total stops and car loading are gated to the signal summing means in this manner.

An eighth feature is the development of analog signals for each of a plurality of elevator service capability criteria of a car as by digital-to-analog addition circuits from counters and registers all coupled to a common circuit such that a sum signal is developed for service capability of that car. This sum signal thereby provides an indication of overall service capability of the car relative to the given landing for a plurality of dissimilar criteria of service capability.

A further feature is the means for selecting the car having the optimum service capability relative to the given landing by comparing the sum signal of each car with a standard which changes with time. A ramp signal generator issues a signal to a comparator for each car. The sum signal established for the car is also applied to the comparator. Interlock circuits terminate the signal evaluation when a coincidence occurs in one comparator. The car of that comparator is assigned to the call. Thus all cars of a plurality are considered broadside, that is, simultaneously and the car best disposed to serve the given landing is assigned.

The above and additional objects and features will best be appreciated from the following detailed description when read with reference to the accompanying drawings wherein.

Figure 2:
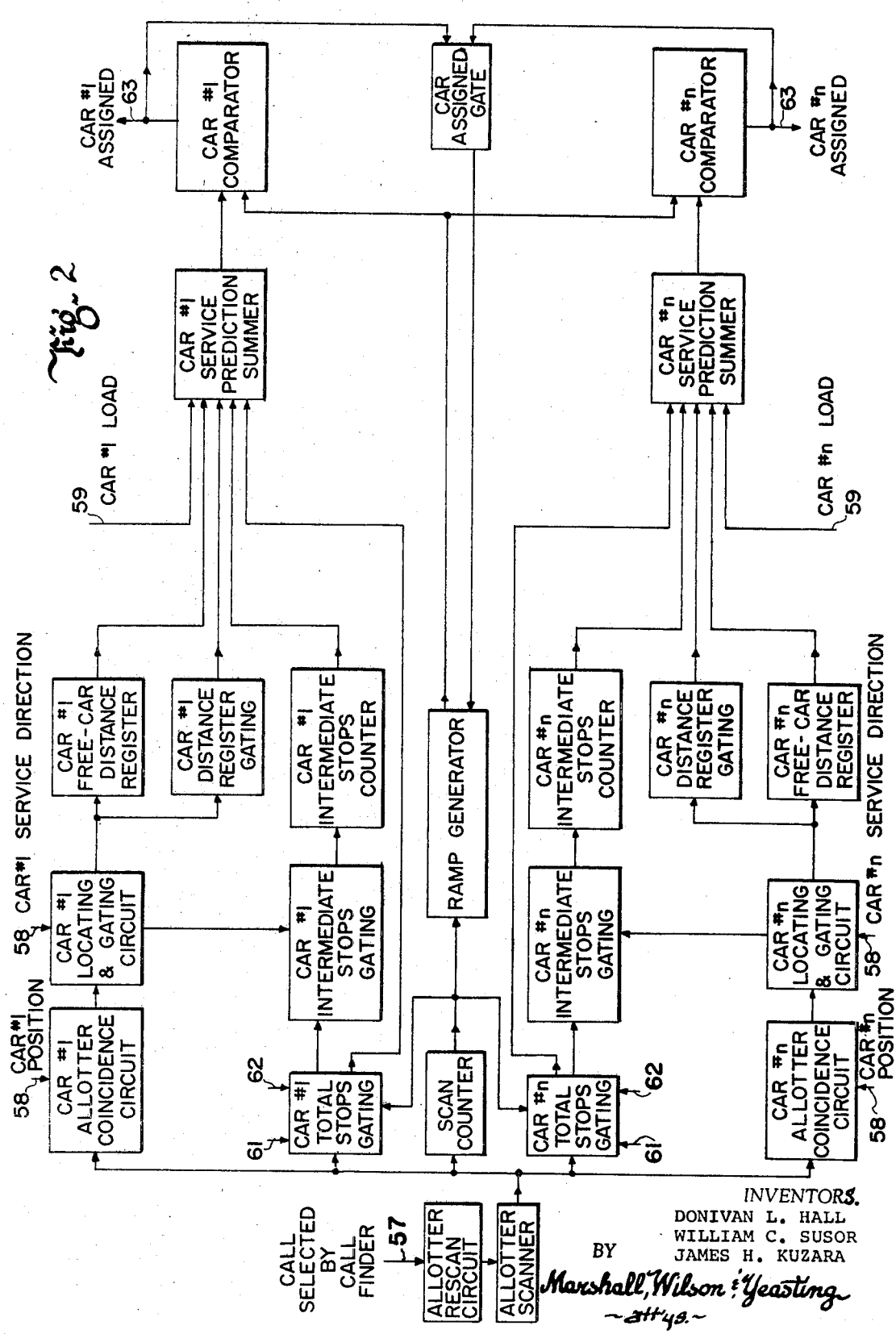
FIG. 2 is an expanded functional block diagram of the block labeled "Call Allotter" in FIG. 1.
Figure 5:
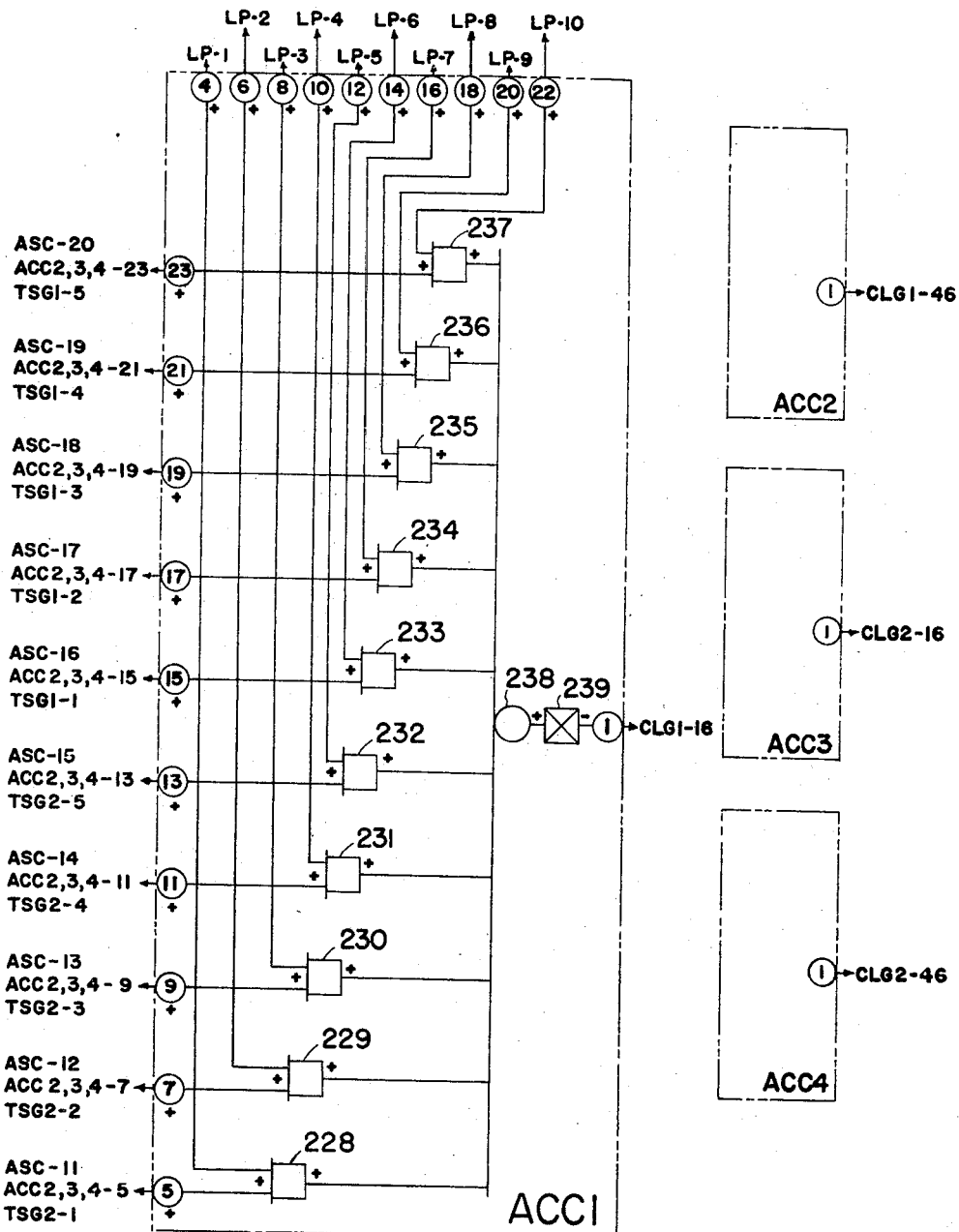
Figure 6:
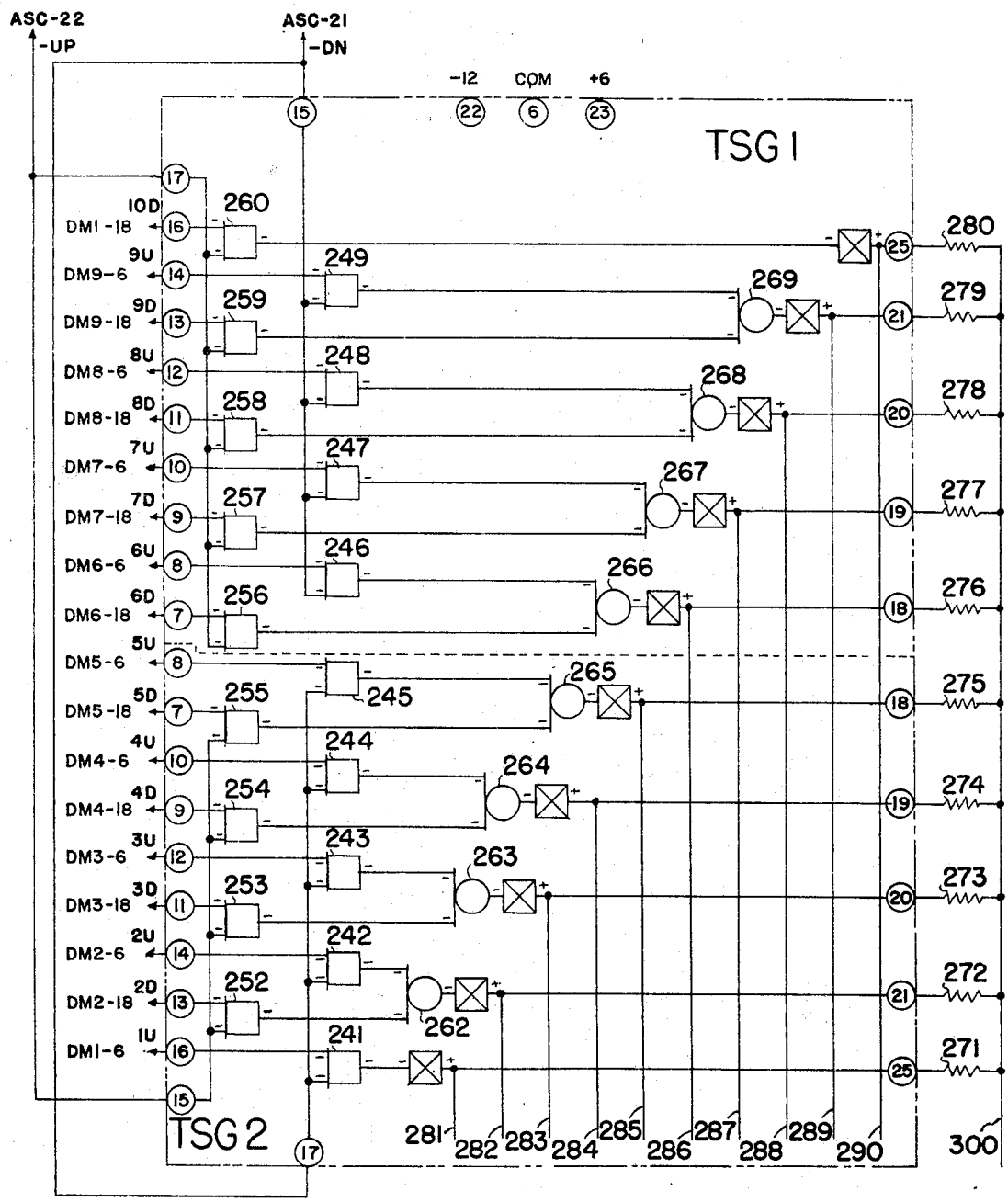
Figure 8:
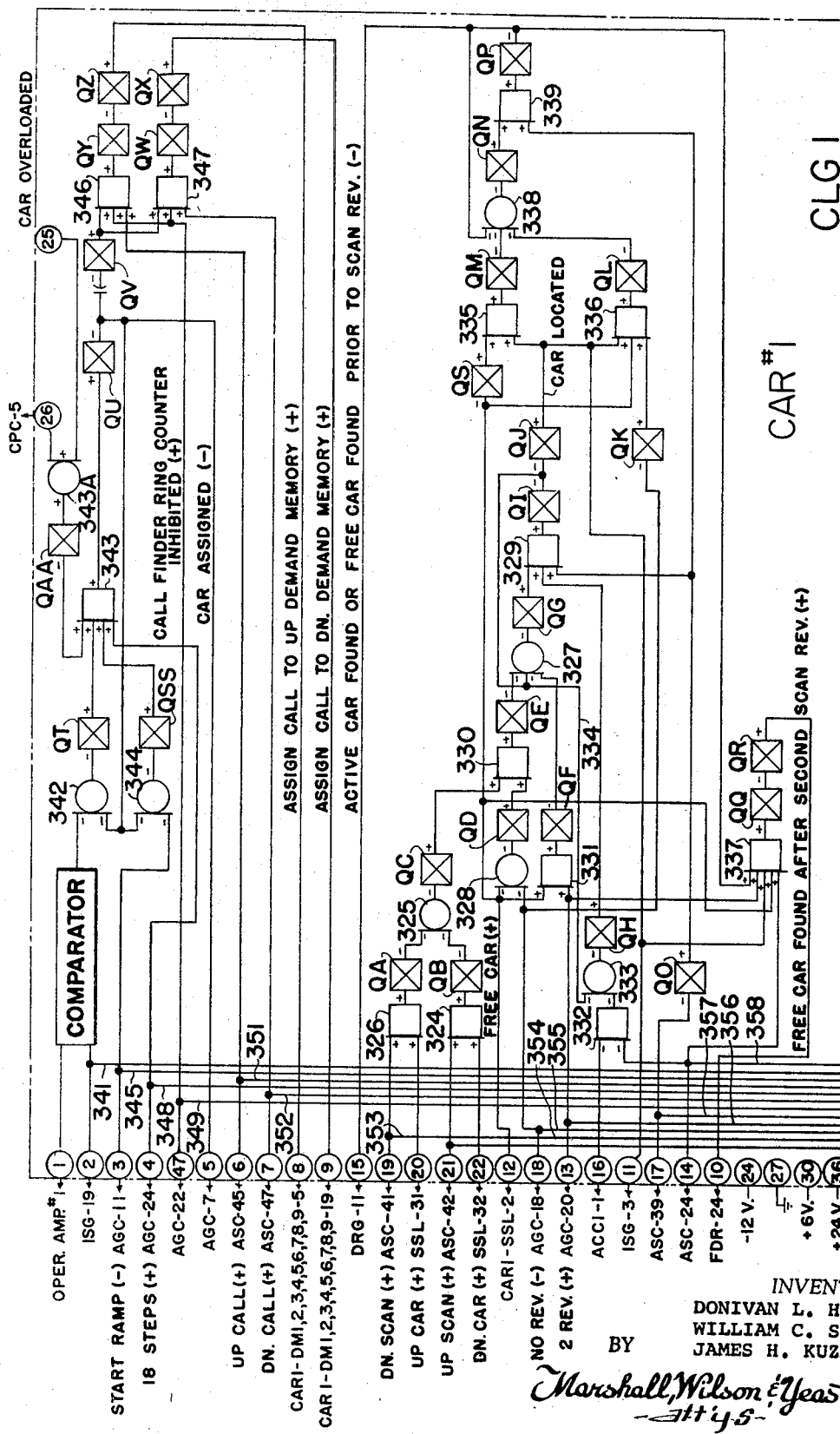
Figure 10:
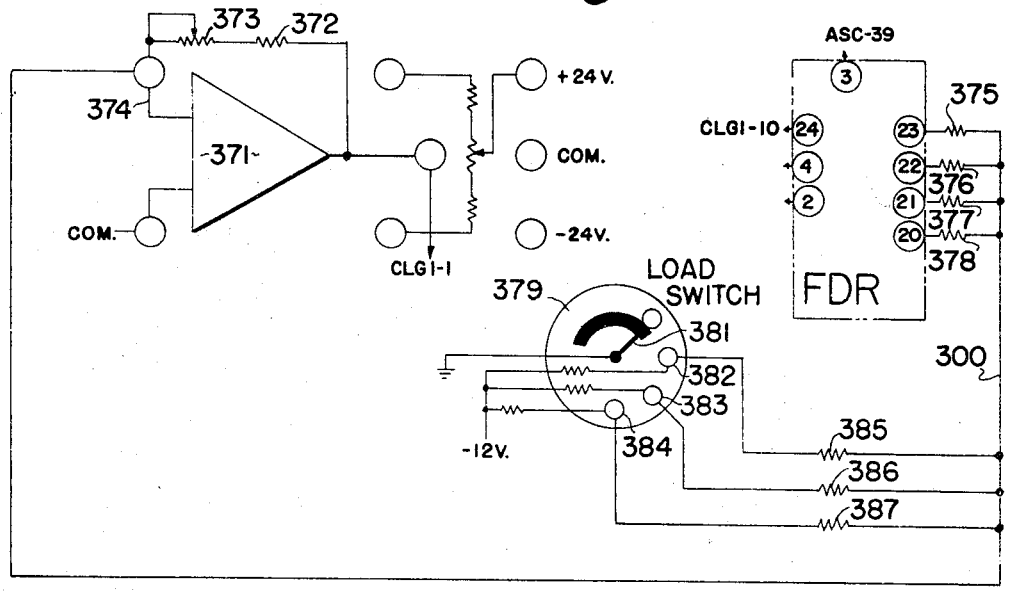
Figure 9:
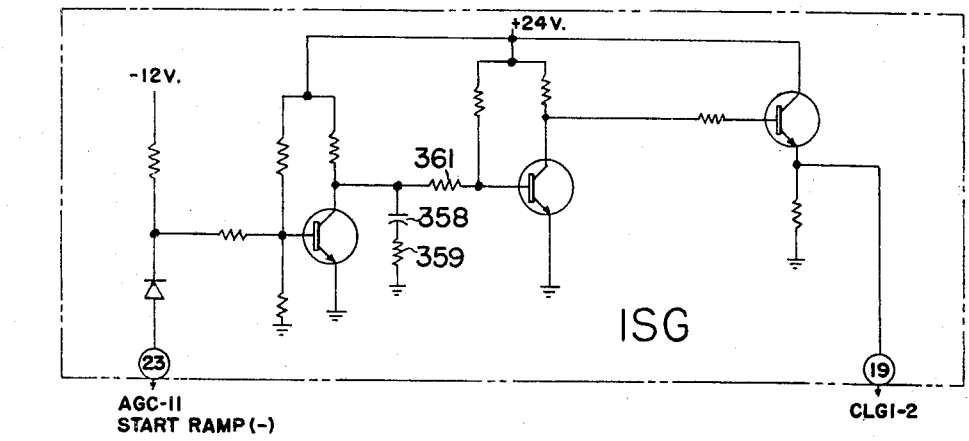
Figure 11:
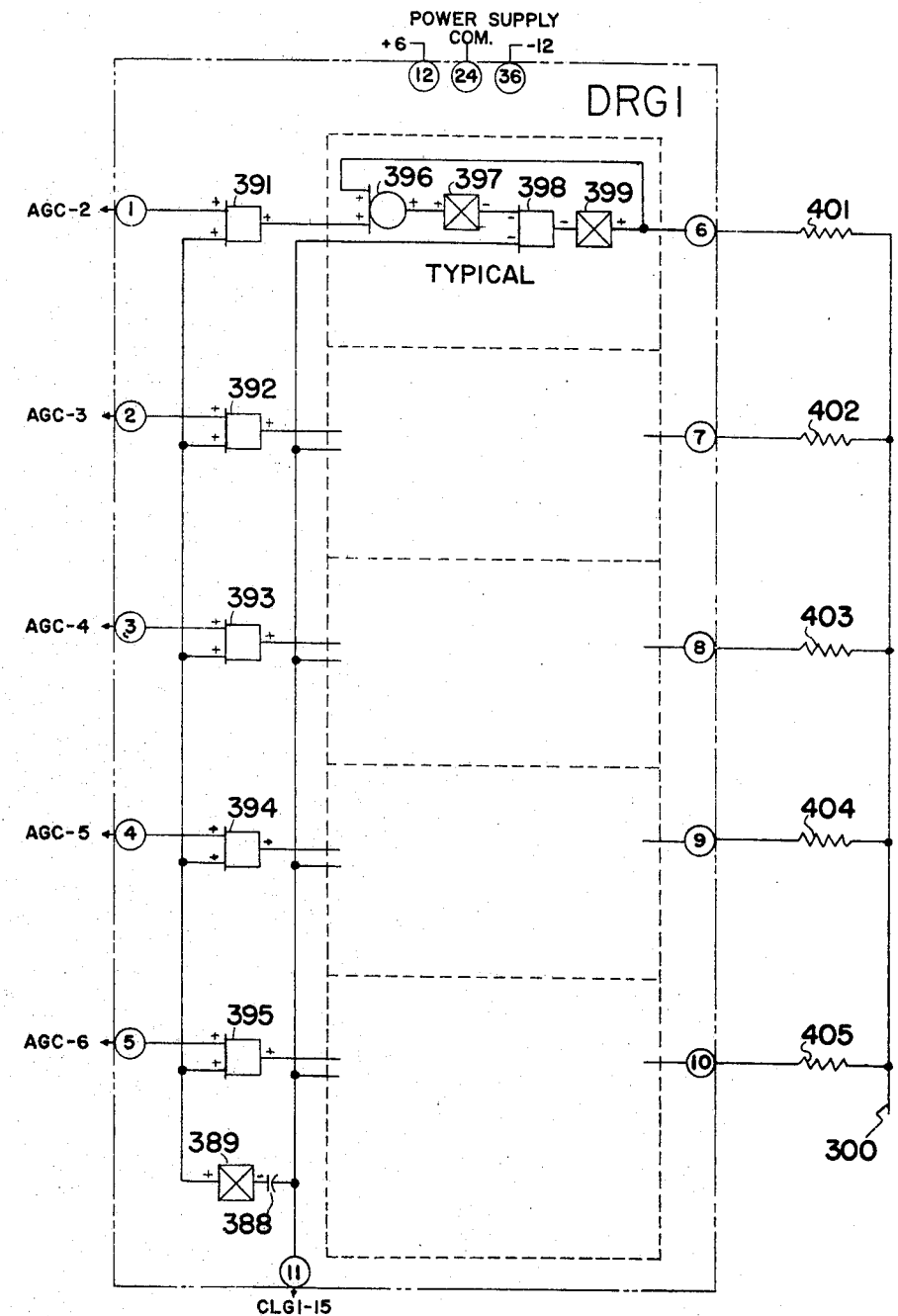
Figure 12:
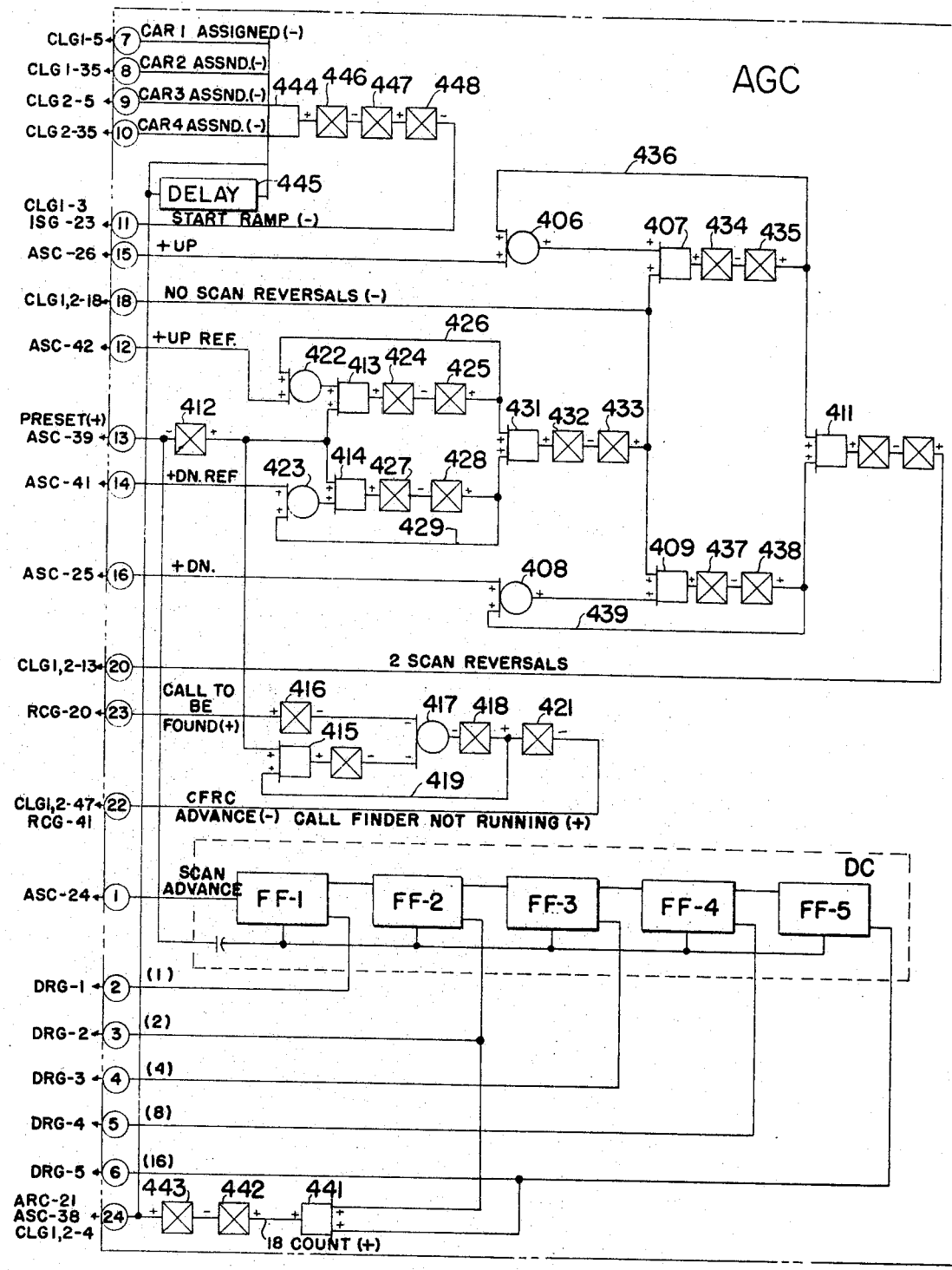

FIG. 5 is a logic diagram of a typical allotter coincidence circuit ACC1 for car 1 and block representations of corresponding controls ACC2 to ACC4 for cars 2 through 4 as shown generally in FIG. 2;

FIG. 6 is a logic diagram of a portion of the total stops gating circuits for car 1 TSG1 and TSG2 typical of such circuits TSG3 to TSG8 for cars 2 to 4 as shown generally in FIG. 2;

FIG. 7 is a logic diagram of another portion of the total stops gating circuits for car 1 TSG1 and TSG2 also typical of those circuits for cars 2 to 4 together with the intermediate stops gating circuit logic elements of which are shown only for car 1, and the intermediate stops counter for car 1 typical of counters for each car, all as shown in block form in FIG. 2;

FIG. 8 is a logic diagram of that portion of the car locating and gating circuit CLG1 for 1 and is typical of corresponding circuits for car 2 incorporated in another portion of that module and of the module CLG2 for cars 3 and 4 as represented in FIG. 2;

FIG. 9 is a schematic diagram of the ramp generator employed in the embodiment of the call allotter shown in FIG. 2 to develop the comparison base for the several car service capability signals;

FIG. 10 is a logic diagram of the counter of free car distance, free car distance register FDR, for a typical car, the load switch and the comparator for that car, all as shown in block form in FIG. 2;

FIG. 11 is a logic diagram of one typical section and block representations of the remaining sections of a car distance register gating circuit for car 1 DRG1 corresponding to such circuits DRG2 to DRG4 for cars 2 to 4 as set forth in FIG. 2;

FIG. 12 is a logic diagram of the allotter gating circuit AGC and the distance counter DC of the illustrative system as shown in FIG. 2.

The invention has been illustrated as applied to a ten landing structure served by four elevator cars. An up hall call switch (not shown) is located at each of the first through ninth landings, and a down hall call switch (not shown) is located at each of the second through tenth landings to enable prospective passengers to register hall calls. Each car is provided with a car call switch (not shown) for each landing.

Individual car control can be accomplished by several means. However a preferred control is typified by that disclosed in United States patent application Ser. No. 380,385 of Donivan L. Hall et al. filed July 6, 1964 for Elevator Control wherein the elevator car is controlled by externally supplied start, direction and destination signals supplied in the present instance from the supervisory control disclosed in the cofiled patent application of Hall and Susor. The car control provides the supervisory control with a signal indicating the final stop in a normal slowdown sequence for the car at all times so that when a destination signal is matched slowdown is initiated and the car follows a slowdown pattern to stop at its destination. In addition to the initiating signals interchanged between the car controls and the supervisory control there are several secondary or permissive signals interchanged as that enabling the hall lantern to be lighted and that indicating the car and hall doors are closed. Thus in general the car control is maintained separate from the supervisory control and the interlinkages between those controls heretofore afforded by the various circuits commutated by the flow selector mechanism of each car are not required in the present system.

The system with which the present invention has been illustrated can be considered in three main sections. A call finder selects a call and locates it as a base from which the assignment between that call and a car proceeds. A call allotter considers the disposition of each car in the system with respect to the call located by the call finder and assigns the car predicted to be most favorably disposed to the call. The car logic senses the location and service requirements of the calls assigned the car and issues start, and directional signals to the car in a manner to cause it to serve those calls. The car logic includes portions which are the subject of a separate patent application for "Elevator Controls" which is particularly concerned with the relationship between calls and cars and the means of ascertaining that relationship and is filed herewith as U.S. patent application Ser. No. 494,056 in the names of James H. Kuzara and Orvale J. Martin.

The illustrative system is of such a magnitude that its disclosure has been abbreviated where possible by showing only representative examples for those circuits which are repeated. In general the system has been constructed in circuit modules and accordingly where possible a module or a substantial portion of a module has been shown in each drawing figure. Modules have been segregated by dot-dashed enclosing lines in the drawings.

In a system of the type which will be considered below involving a plurality of similar elevator cars for which similar functions are performed, the control circuitry follows relatively well developed patterns wherein for example the car functions for one car are duplicated for every other car. In view of this substantial amount of duplication and in an effort to simplify the disclosure of this invention where possible, typical circuits have been set forth in logic diagram form and where repetition of those circuits occurs, only blocks representing the circuits are depicted. Inasmuch as the interconnections of even simplified logic diagrams if presented with any degree of completeness tends to confuse rather than illustrate the salient features of the invention, such interconnections have in large part been avoided by applying terminal number designations to each one of the typical circuits set forth and the connection of those terminals to the terminals of other circuits has been indicated by reference characters characteristic of those destination terminals positioned adjacent the arrow-headed leads issuing from the illustrated terminal. Thus, as will be seen from a review of FIG. 5, an allotter coincidence circuit for car number 1 designated ACC1 is illustrated in logic diagram form. That circuit is provided with a number of external terminals each of which is designated by a circle containing a numeral and positioned adjacent the dot-dash line embracing the circuit and in the lead to that terminal. A similar allotter coincidence circuit is provided for cars 2 through 4 in the illustrative system as represented by the rectangles labeled ACC2, ACC3 and ACC4. In order to simplify the disclosure only circuit ACC1 is shown as a complete logic diagram.

Intercoupling of the modules of the present drawings has followed a uniform nomenclature wherein each module has a letter designation and each terminal of each module is numbered. On the drawings the terminals are shown as circles with their numeric designations within the circle. The modules have been designated on the drawings by their reference characters. Couplings from the terminals are indicated by designation of the module and terminal number to which a terminal is connected located adjacent an arrow-headed lead extending from the terminal. These designations are by the reference character of the module followed by a dash and the terminal number of that module.

In order to further facilitate an appreciation of this invention, the reference characters utilized to identify the major circuit components have been tabulated in alphabetical order together with a short functional name for those circuits and where illustrated the figure in which those circuits are found.

Figure 3:
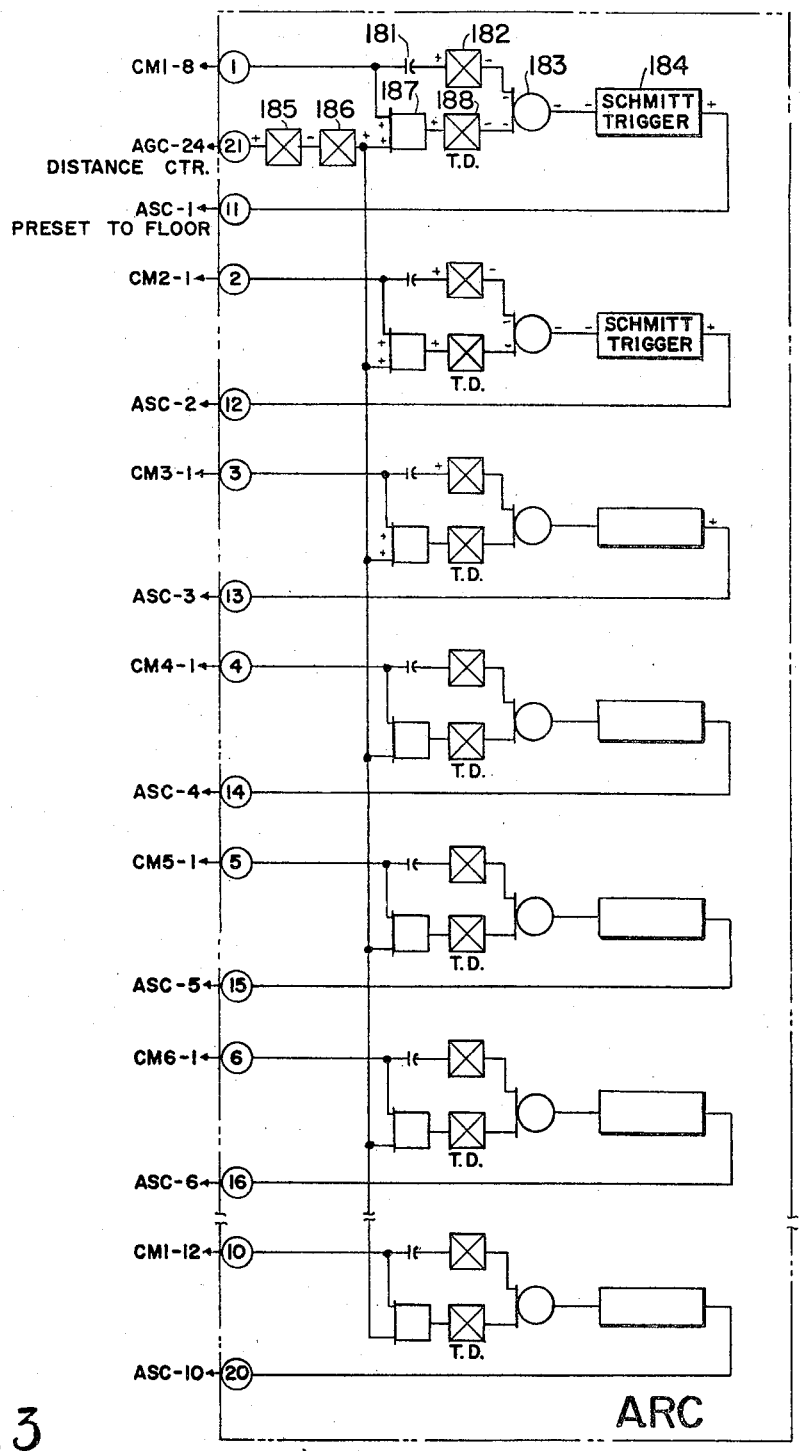
FIG. 3 is a logic diagram of an allotter rescan circuit typical of this invention.
Figure 4:
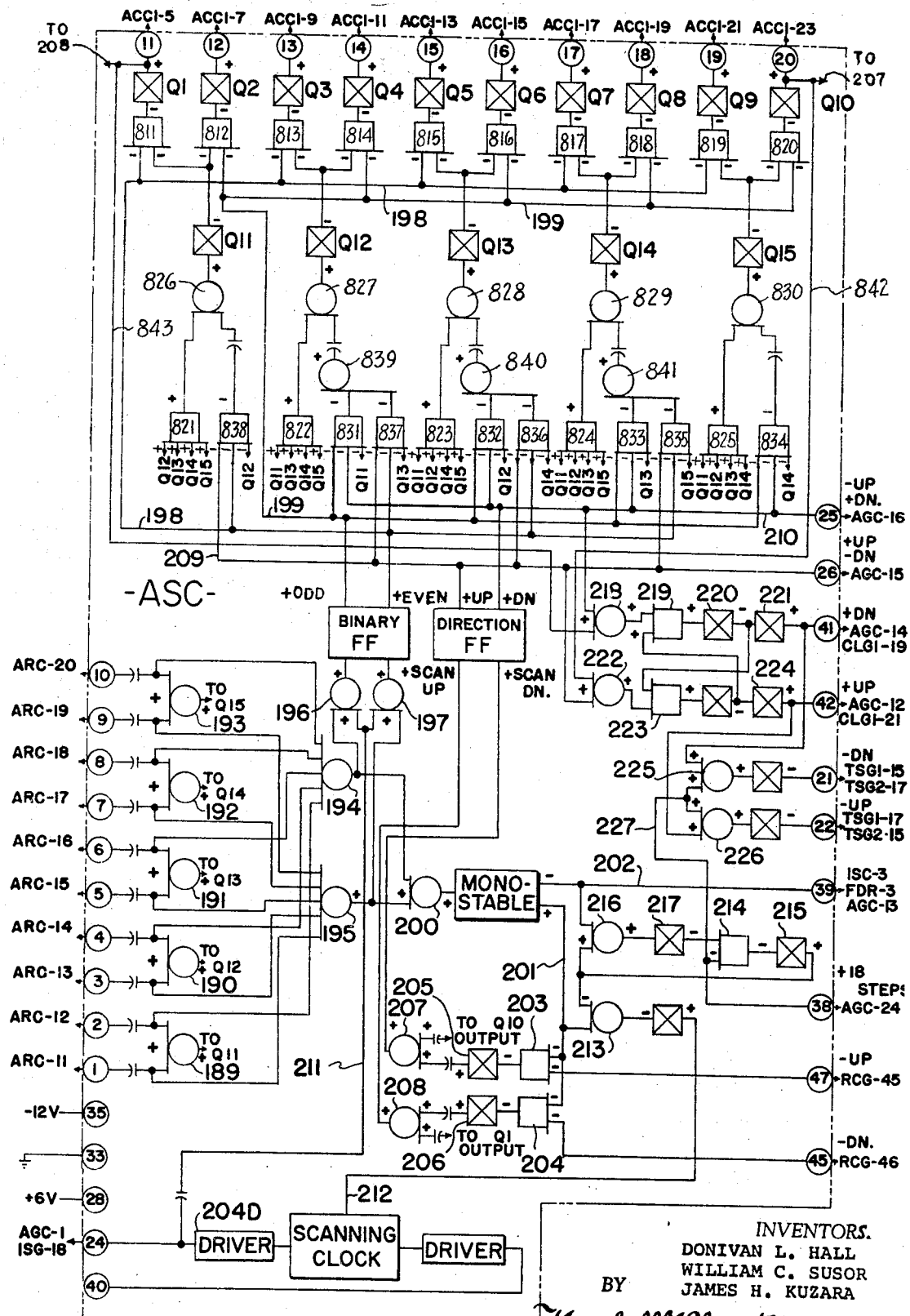
FIG. 4 is a logic diagram of one form of allotter scanner circuit suitable for this invention and constituting a more detailed disclosure of the "Scanner" of FIG. 2.

| Symbol | Functional Name | Location |
|---|---|---|
| ACC1–ACC4 | Allotter Coincidence Circuit, Cars 1–4. | Fig. 5 |
| AGC | Allotter Gating Circuit | Fig. 12 |
| ARC | Allotter Rescan Circuit | Fig. 3 |
| ASC | Allotter Scanning Circuit | Fig. 4 |
| CLG1 | Car Location and Gating Circuit, Cars 1 and 2. | Fig. 8 |
| CLG2 | Car Locating and Gating Circuit, Cars 3 and 4. | |
| CM1 | Call Memory, 1st Up and 10th Down. | |
| CM2–CM9 | Call Memory, 2nd to 9th | |
| DC | Distance Counter | Fig. 12 |
| DM1 | Demand Memory, 1st Up and 10th Down. | |
| DM2–DM9 | Demand Memory, 2nd to 9th | |
| DRG1–DRG4 | Car Distance Register Gating, Cars 1–4. | Fig. 11 |
| FDR | Free Car Distance Register | Fig. 10 |
| ISC | Intermediate Stops Counter, Cars 1–4. | Fig. 7 |
| ISG | Intermediate Stops Gating, Cars 1–4. | Fig. 7 |
| ISG | Ramp Generator in ISG | Fig. 9 |
| RCG | Ring Counter Gating | |
| TSG1–TSG8 | Total Stops Gating, Cars 1–4 | Figs. 6 and 7 |

Inasmuch as logic elements such as flip flops, coincidence gates, anti-coincidence gates and inverters are available in many forms and are well known in the art, the structures of such elements for AND's, OR's, NOR's, MEMORY's and operational amplifiers have not been set forth in detail and the invention's circuits have been represented as logic diagrams rather than schematics.

While the functions of these elements can be accomplished in large part with electromagnetic switching, it is considered too slow for practical application wherein the entire call finding and allotting function is to be performed for a call in a matter of milliseconds. Accordingly, the system illustrated here employed solid state switching and logic elements.

DESCRIPTION OF FIG. 1

Figure 1:
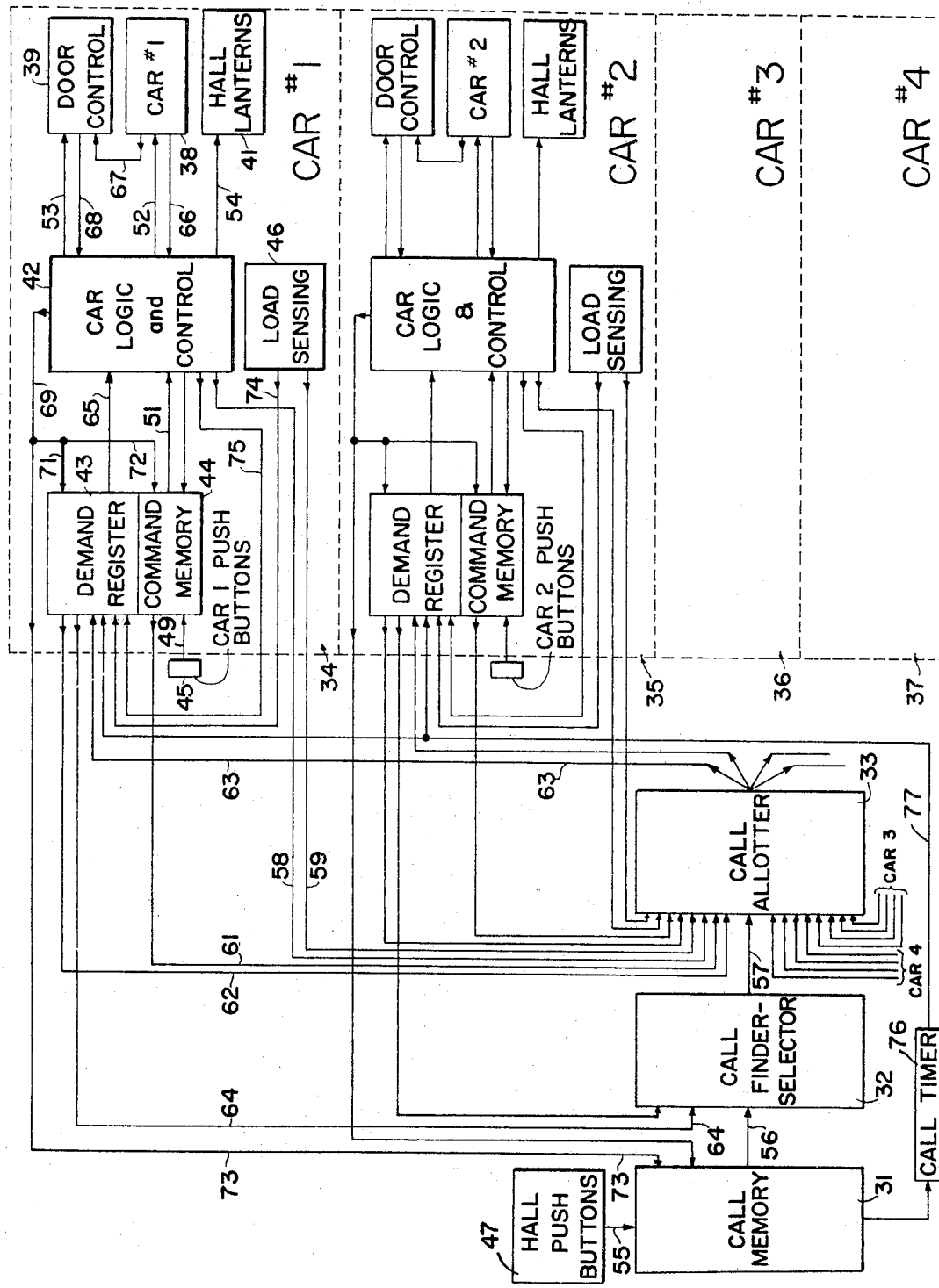
FIG. 1 is a functional block diagram of an elevator system according to the present invention including subdivided block diagrams representative of a set of functional elements for typical elevator cars.

As depicted in FIG. 1, the system of this invention involves three major elements common to all of the cars represented by a call memory 31, a call finder-selector 32 and a call allotter 33. The exemplary system made up of four cars is illustrated in FIG. 1 by car logic function groups for cars 1 and 2 broken down in functional block diagrams and for cars 3 and 4 represented by the general blocks wherein cars 1–4 are identified by blocks 34, 35, 36, and 37. The typical car logic functions for car 1 are illustrated within the major car block 34 and comprise the car itself 38 including its hoisting mechanism and the means for generating a car position signal, a door control for the car 39, and hall lanterns 41 for the car indicating the proximity of the car to a landing and its condition to both stop at that landing and to travel therefrom in a given direction. Each of the door control, car and hall lantern control blocks are coupled both to supply to and receive signals from a car logic control 42 which determines the starting, stopping and travel direction of the car in serving its assigned service requirements. Those requirements are supplied from a demand register 43 which indicates the landings at which the car will stop in response to assigned hall calls and a command memory 44 which retains the registration of the car calls registered within the control panel within the car represented by the block 45. Certain of the control functions as will be more fully understood hereinafter are provided by a load sensing means 46 for the car which can indicate the car loading in terms of either the number of passengers within the car or the weight of the load within the car, for example.

Service requirements are imposed upon the system by the means of hall call switches represented by the rectangle 47 and by car calls from the rectangle 45. Car calls are registered by conventional means within the car as displayed on control panels therein and are applied directly as represented on the path 49, to the command memory 44 for the respective car. In order to distinguish the response of a car to a car call from that response to a hall call, it will be convenient to consider a registered car call as a "command" inasmuch as the car must respond to such calls in order to clear them from the system and no other car can serve such calls. The hall calls are distributed among the cars by the call allotter 33 and as assigned by the allotter are termed "demands." Accordingly once a car call has been registered, it is entered into a command memory and held there until it is cancelled by the response of the car to that call. The signals in command memory 44 are applied as over the path 51 to the car logic control 42 which in turn develops the direction start and stop signals over path 52 to the hoist motor controls of the car represented by rectangle 38. The car logic control also develops the start, stop signal to the door control 39 over the path 53 and at appropriate moments in the operation of the car and preceding its arrival at the landing for which the call is registered, it issues a stopping position signal over path 54 to the hall lantern controls 41, over path 53 for door control 39, and over path 52 for the retardation of the hoist motor.

Operation of the car 38 causes a car position signal to be issued to the car logic control 42 over the path 66. As the car advances along the hatchway it comes to close proximity to a landing. It enters a region commonly termed a door zone and a door zone signal is issued over the path 67 from car 38 to door control 39. The door control 39 in turn issues door close and open signals to the car logic control over the path 68 at appropriate points in the operating cycle of the car. In the particular example under consideration here, the closing of the car doors after the response of the car to either a demand or command causes the cancellation of that demand or command by issuing a reset signal from the car logic control 42 over the path 69. However, alternative call reset techniques can be employed such as the stop of the car, the opening of the doors or the initiation of door closing after stop.

A demand memory reset signal is passed over the path 71 to the demand register 43 and over the path 72 to the command memory 44. Storage of the hall call signal in the call memory 31 is also canceled at this time by a reset signal over the branch 73 from path 69.

When conditions arise which indicate that a car is unduly delayed in serving the demands and commands imposed upon it, the demands can be released and the hall calls from which they mature reassigned as demands on other cars. Two sources of an indication of such delayed service are shown. When the car is loaded in excess of some predetermined level, stops in response to demands would be unfruitful inasmuch as no room would be available in the car to transport the passengers waiting at the landings. On the other hand, where a demand and a command exist for the same floor, it is to be presumed that the stop of the car for the command will result in the discharge of at least one passenger and accordingly the creation of room for the acceptance of at least one passenger from the landing. Accordingly, when the load sensing control 46 develops a signal characteristic of a predetermined loading, a reallocation signal is issued over the path 74 to the demand register 43 whereby those demands which do not coincide with commands for the car are released. Similarly, when other factors delaying the car service develop, as sensed in the car logic controls, for example when the doors of a car are held open unduly at a landing, a delayed service signal is issued from car logic control 42 over path 75 to the demand register 43 to cancel the demands which do not coincide with commands. A further example of an undue delay is that occurring when a hall call is registered an excessive interval. A call timer 76 times the interval each call is retained in call memory 31. When the interval of registration exceeds a certain amount, a signal is issued on path 77 to remove the assigned call from its demand register and the timer 76 is reset or negated for further intervals for that call. The cancellation of the demands in the demand register corresponds to the registration of an unassigned hall call inasmuch as the hall call from which the demand was developed, remains registered in the call memory 31 until a car has responded to that call by satisfying its demand. Accordingly, upon release by the demand register, the call again is fed to the call finder selector and from the call finder selector to the call allotter for reallottment to the cars in accordance with their ability to satisfy the calls.

The switches for registering hall calls represented by the rectangle 47 include up and down call switches for each landing but the terminal landings in the usual elevator system and an up call switch at the lower terminal landing and a down call switch at the upper terminal landing.

Once a hall call is registered, it is retained in registration by means of call memory 31 until it has been served. A call entered in the call memory, according to the present invention, is assigned to but one of the cars available in service, by means of the call allotter 33 through the intermediate function of the call finder selector which segregates calls within the memory in a serial relationship for assignment. Each call registration is entered into the call finder selector over path 56 in which it is serially selected for consideration by the call allotter and is transmitted to the call allotter as a signal indicating the location of the call and its required direction for service over path 57.

The call allotter ascertains the relationship of active cars in the system relative to the selected call and assigns a car which is suitably related to the selected call for expeditiously serving that call.

Registration of a call for service from a landing by a prospective passenger is made on a directionally selective basis by means of landing call buttons. Such calls are stored in call memories until they have been cancelled by the response of a car stopping at the landing of the call and conditioned to depart therefrom in the direction of the call. Since landing calls are imposed in a random fashion and since they can be satisfied by any number of cars, those calls entered into call memories are allotted individually to the cars. The call finder serializes the landing calls for the disposition to the several cars by the allotter.

The stored landing calls in the call memories CM1 to CM9, when not allotted, actuate the call finder ring counter (not shown) to cause it to step from landing position to landing position until it encounters a position for which a call to be allotted is registered. Thus, the call finder ring counter starts from the position of its previously found call and advances to the next call for service in the direction the scanner is advancing. If the activated call memory coincides with the setting of the call finder ring counter, no advance of the counter occurs. When the ring counter CFRC reaches its limit of positions, the first and tenth positions in a ten landing elevator system, it reverses its direction of advance. If advancing in the direct sequence, one to ten, when the counter reaches ten it enters the inverse sequence, ten to one. From the inverse sequence it is switched to the direct sequence after it has reached its first position.

Ring counter gating circuits respond to an activated call memory for an unallotted call to start the call finder ring counter in the event it is not set at the position of the call. They also stop the counter when the call memory has been found. The gating circuits set the scanning direction of the allotter scanner ASC so that the allotter scanner initially hunts downward from its position preset by the found call memory when the call is an up landing call and upward when it is a down landing call.

The allotting process involves predicting for each car the service capability of that car relative to the selected call assigning the selected call to that car which is either closest and has an acceptable service capability or is conditioned most favorable to serve the call. Call assignment is enabled through the allotter path 63 to the demand register 43. This assignment is to be demand memory for the direction and landing of the call memory upon which the call finder is effective and for the car selected by the allotter. Thus at the time the call finder selects a call the demand memories for that call in each car are enabled. However, only that demand memory for the selected car is gated by the allotter. Once the demand register 43 receives the allottment of the call, it issures a signal on path 64 to release the call finder selector 32.

As in the case of the command memory, the demand register section of the car control issues signals over path 65 to the car logic control to indicate the location and direction of the demand whereby the car logic control can institute appropriate car starting and direction setting functions for the car control 38 over path 52.

DESCRIPTION OF FIG. 2

The allotter of FIG. 2 is shown in more detail in FIGS. 3 through 12. It assigns a car to a call selected by the call finder in response to a signal issued on path 57. In developing the assignment it enables all demand memories of the selected car on path 63 so that the memory for the landing and service direction of the selected call is actuated. It responds to inputs including car position and service direction on path 58, car loading on path 59, commands assigned the car on path 61 and demands assigned the car on path 62 for each car.

The allotter considers all cars simultaneously in broadside fashion and selects the car having the optimum service capability with respect to the selected call to serve that call. In ascertaining the optimum car it effectively predicts the ability of each car to travel to the call expeditiously by considering its distance from the call, the number of stops for demands and commands between its current position and the call, and the load imposed on the car. It further provides some measure of the service capability of each car following the stop at the call by also considering the total number of stops as indicated by the total number of demands and commands assigned each car. In equating these factors to predicted service time a system including cars operating at 600 feet per minute and serving ten foot heights is arranged to allow one second per floor of travel as ascertain in the distance registers. Such a system would require about twelve seconds to slow from full speed to a stop, open its doors, serve a call, closes its doors, and accelerate to full speed. Each stop is scaled to six seconds in the total stop gating circuit. Each intermediate stop is additionally scaled to six seconds. Each passenger indicated by the load sensing means is assigned a signal scaled to one second to approximately the amount of time he requires to transfer from the car to a landing. The car having the total signal representative of the lowest amount of time is selected to be assigned the call.

The allotter includes a scanner which is preset by the signals on path 57 from the cell finder to initiate its scan from the location of the selected call and to scan in a direction opposed to the service direction of the selected call. The scanner can be either a bidirectional counter having a scan position for each landing which can be related to scan direction to distinguish between ascending and descending service directions for the cars or it can be a ring counter having scan positions corresponding to each landing call which close upon themselves as, for a ten landing elevator system, in an ascending sequence 1 through 10 followed by a descending sequence 9 through 2 and back to 1. In this latter arrangement the scanner can always scan in a direction opposed to the sequences recited, that is downward for the ascending sequence and upward for the descending sequence. The preset of the scanner to the position of the landing as 8 or "8 up" for a selected "8 up" landing call is coupled with a scan set in the descending sequence of 7 or "7 up," 6 or "6 up" etc. so that a scan position is sensed for each potential stop between the selected call and a car approaching the call.

These scan positions are passed to an allotter coincidence circuit which senses coincidence between scan position and car position for all cars. This circuit is fed from the car position and service direction signal sources for each car. The car logic and control equipment can be considered to provide the information to the car position and service direction circuits over path 58 of FIG. 1 so that a coincidence between the allotter scan and car position and direction can be sensed. In the example, if car No. 2 is an "up car" at landing 6 after two scan steps, coincidence is achieved at position "6" direction "up" (scan direction down) or at "6 up," depending on the type scanner.

The scan is advanced through a cycle so that it establishes coincidence with at least all cars in service without interruption. One convenient technique is to scan the entire range of travel. If the assignment of a car is not made shortly after the completion of the evaluation of each car's capability to serve, the scan is repeated. Such failure to assign a car can arise where all cars have predicted service time intervals so great that an assignment would be invalidated by changing conditions prior to the service being rendered to the call. In the example if the shortest predicted service time is sixty seconds or more no assignment is made. A second scan is utilized to confirm the validity of the first prediction or to sense any changes in conditions which might alter that prediction.

A call selected by the call finder is passed from path 57 to an allotter rescan circuit which develops a sharp pulse to preset the scanner position and scan direction. The pulse is repeated if an assignment is not made within a predetermined time interval sufficient to complete a normal assignment.

The pulse from the allotter rescan circuit causes the scanner to start from the landing of the selected call and to be advanced through positions corresponding to landings to be scanned step-by-step and to be fed to an allotter coincidence circuit and a total stops gating circuit for each car. Each car's position is passed to its allotter coincidence circuit so that it issues a signal to the car locating and gating circuit for the car when there is a coincidence between scan position and car position. Two such coincidences occur for each car in each scan however the car locating and gating circuit identifies that coincidence which occurs when the scan direction opposes the car service direction and issues a "car located" signal at that time.

The "car located" signal is passed from the car locating and gating circuit to the distance register gating circuit and the free car distance register circuit. In the distance register gating circuit a count is registered based upon the number of scan steps from the call position to the car position to indicate the spacing of the car from the call. This count is translated to an analog signal scaled to the time predicted as required for the car to traverse the distance and is applied to the car's service prediction summer.

The "car located" signal is also passed to the car's free car distance register if the car is in service and has no commands or demands assigned so that it is a "free car." Free car distance is distinct from that measured in the distance register gating circuit since the latter is concerned with travel including reversals. Thus a descending car is related to an up call by its separation from the bottom terminal and the distance from the bottom terminal upward to the call. A free car, on the other hand, has no predetermined course of travel. It normally is parked at the landing to which it last provided service. It can be started in either direction to run to the call. Hence, only the absolute distance between the car and call need be considered in ascertaining its service capability.

Free car distance is measured in the scan portion between the initiation of scan and the first reversal in the free car distance register. The distance for the remainder of the possible locations of a free car is measured in a separate free-car distance register which is effective over the range of scan following the second scan reversal to the termination of scan adjacent the initial scan position. This register, which may be a binary counter of scan advance pulses, is gated by scan position-car position coincidence to count the landings from the car to the scan initiation position. The binary count is translated to an analog signal scaled to travel time and applied to the cars service prediction summer.

The number of stops of each car is required to make as indicated by the commands and demands assigned to it is also considered in ascertaining service capability. Those stops are considered which are between the car and the landing of the call as well as the total stops. The intermediate stops are accumulated in an intermediate stops counter as the scan progresses. Each coincidence of a scan position with a landing for which there is an assigned command or demand is sensed in the car's total stops gating circuit and passed through its intermediate stops gating circuit to the car's intermediate stops counter. The counter translates the number of stops into an analog signal scaled to time. This signal is applied to the car's service prediction summer.

Total stops are gated into the car's total stops gating circuit at the end of the allotter scan as the commands and demands assigned the car. This count is translated to an analog signal also scale to time and applied to the service prediction summer. A fifth source of signals to the service prediction summer is the load sensing means 46 which applies a signal scaled to time and proportional to loading of the car over path 59.

The summer of each car produces a signal which is the sum of loading, intermediate stops, total stops, and distance between call and car scaled to time. That car having the lowest sum signal is the one having the best predicted capability to serve the call and is assigned to serve the call. The sum signals of all cars are compared to a standard which is generated after the allotter scan has been completed and all factors involved in the prediction of service capability have been developed and applied to the summers. Thus, when the scan has proceeded through the number of steps required to completely scan the service range of the elevator system, eighteen in a ten landing system, the scan counter issues a gating signal to the total stops gating circuit of each car and to a ramp signal generator. The ramp signal increases with time. It is applied to a comparator circuit for each car to which is also applied the total service prediction signal of that car in a manner such that the two signals are compared. If a total signal is encountered having a level coincident with the ramp signal, the associated car is assigned the call, the ramp generator is stopped and the call finder and allotter are released for processing further calls. If no coincidence of a total signal with the ramp signal is encountered, as where the total signal for each car exceeds the upper limit of the ramp signal, no assignment is made and the allotter rescan circuit causes the allotter to recycle.

ALLOTTER

The allotter develops an assignment between the landing call selected by the call finder and an elevator car which is in a condition to expeditiously respond to that call. The allotter introduces that call into a demand memory individual to the car, the landing and the service direction. Such a call is thereafter considered a demand upon that car.

The allotter can accommodate any number of factors considered significant in evaluating the capacity of each car to serve the call subject to assignment. Each factor can be weighted according to its degree of importance with respect to the car's service capacity and can be assigned different levels in accordance with the magnitude of the factor currently imposed upon the car or system as a potential detriment to service. The factors are summed for each car and the assignment is made to the car having a sum with a predetermined relationship to the sums of other cars. In the illustrative embodiment, the car having the smallest sum is allotted the call on the basis that that sum represents the optimum service capability as composed generally of the shortest anticipated answer time and the most expeditious response to the service anticipated to be required by the call for any car capable of answering the call.

The relationship of the call to each car is ascertained by counting the number of landings between the call and the cars either as the number of landings the car will be required to pass in completing that portion of a round trip terminal-to-terminal to advance to the call or the absolute travel distance in the case of a free car. Such a count is obtained by the allotter scanner of FIG. 4 which counts from the call in the direction cars capable of serving the call would approach the landing of the call. The scanner scans the entire travel range in both the up and down direction locating cars set for up service while scanning downward and cars set for down service while scanning upward. Cars are identified as to their location in the individual allotter coincidence circuits of FIG. 5 and their distance from the call is indicated in their distance register gating circuits of FIG. 11. This provides one criterion of the predicted time required of each car to answer the call if it were assigned the call.

Another criterion of predicted answer time is the number of stops required of the car in traveling to the call. This is ascertained by the car locating and gating circuits of FIG. 8, the intermediate stops gating circuits of FIG. 7 and the intermediate stops counter of FIG. 7, each of which is individual to the car.

An indication of the interval required of the car to provide service after it has stopped for the call is afforded by the total number of stops assigned to it and the load imposed upon it. The total stops gating circuits for each car as typified in FIGS. 6 and 7 are the means for indicating the total stops assigned. Loading of the car can be ascertained by a load switch as represented in FIG. 9.

The various control functions in the alloting process are in large part performed in the allotter gating circuit of FIG. 12 wherein the initation and termination of the scan by the allotter scanner and the comparison of the several sum signals are actuated.

Under normal operation a car is assigned a call within a maximum of about eleven milliseconds of the initiation of the allottment function. If the service capability signal for each car exceeds a certain level indicative of an excessive service delay the allottment function loses its validity. Accordingly no allottment is permitted since the magnitude of the ramp signal against which the sum signal for each car is compared is restricted and cannot reach coincidence with the sum signals. Under these circumstances a second allottment of the call is attempted on the assumption that the state of the service requirements can be altered in the interim. This allottment is instituted by the alloter rescan circuit of FIG. 3.

DESCRIPTION OF FIG. 3

The allotter rescan circuit of FIG. 3 normally passes a fast rise time preset signal to the allotter scanner preset of FIG. 4 from one of terminals ARC–11 through ARC–20 to ASC–1 to ASC–10 for landings 1 to 10 respectively. This signal is derived from the call memory allotter preset signal terminal 1 or CM1–12 in the case of a first landing up call and CM1–8 in the case of a top landing down call, and is applied to terminals ARC–1 through ARC–10 for landings one through ten as a positive signal when the call is found by the call finder. Blocking condenser 181 passes a positive signal pulse to inverter 182 to gate OR 183 and Schmitt trigger 184 in the case of a found call at the first landing. The Schmitt trigger issues a preset signal to the allotter scanner and a normal allotting function (as will be described) follows.

If the system is saturated so that the summed analog signals for each car exceed the ramp signal maximum against which they are compared, no allottment of the call will occur. The ramp signal is generated following the completion of an allotter scan, indicated by the eighteenth scan step of the scanner in a ten landing system. An end of scan signal appears as a positive pulse at ARC–21 from distance counter DC at AGC–24 of FIG. 12. It is passed by inverters 185 and 186 to AND 187, AND 187 is gated while the call memory indicates a call is registered and not assigned as a demand in one of the cars. Hence it passes a positive signal to time delay 188 provided a positive signal is present at ARC–1.

In a normal allotment of a call the allotment is completed within ten milliseconds of the completion of the scan. The output to the allotter rescan circuit is inhibited by a negative signal at the input from the call memory as at ARC–1 for a selected first landing up call. This negative signal results from the assignment of the call to a car. Time delay 188 is set for about a hundred milliseconds in the example. If the "call not assigned" signal persists for that interval following completion of a scan, the time delay 188 again enables Schmitt trigger 184 to again apply a preset pulse to the allotter scanner preset and initiate a second allotter scan for that call.

The above allotter rescan cycle is repeated for a call passed by the call finder until that call is assigned to a car. Once the call is assigned the call finder and allotter are released to process other calls if such are registered.

DESCRIPTION OF FIG. 4

The location of a call by the call finder and the enabling of the call memory gate presets the allotter scanning circuit of FIG. 4 by applying through the allotter rescan circuit of FIG. 3 a positive signal to the appropriate preset terminal ASC–1 to ASC–10 for landings 1 to 10 respectively. The allotter scanning process involves a progressive scan from the selected call location in a direction to locate cars in advance of the call, initially below the call or downward for an up call and above the call or upward for a down call. Each landing between the call and the cars is counted for individual cars as is each call between the cars and the call during this process. The scanning also involves inverting the hunting direction when the limits of travel are achieved so that each scan can include two scan direction reversals and a return to the originating position.

The allotter scanner of FIG. 4 is a biquinary counter having a number of states or scan positions corresponding to the number of landings in the elevator system. In can be advanced in either direction between adjacent scan position so that the scan positions, when assigned in a sequence corresponding to the landing sequence of the elevator system, can be scanned in an ascending and descending order.

Initially the allotter scanner is preset to the scan position of the landing of the call selected by the call finder as signaled to inputs ASC–1 to ASC–10 from the call memory which is gated by the call finder through the allotter rescan circuit to terminals ARC–11 to ARC–20. The allotter scanner is also set in its scan direction by the call finder. The call finder selects a call when its hunting direction corresponds to the service direction of the call. Its hunting direction is passed by the ring counter gating circuit to the allotter scanner at the time the call is found as a negative signal from RCG–45 to ASC–47 for an up hunt and thus an up landing call, and as a negative signal from RCG–46 to ASC–47 for a down hunt and thus a down landing call.

The allotter scanner is shown in the upper portion of FIG. 4. It is controlled in its scan direction by the direction flip-flop coupled to leads 209 and 210 and in its scan advance by the binary flip-flop coupled to leads 198 and 199. Its preset condition is established by signals applied to one of inverters Q11 through Q15 and to the binary flip-flop to gate one of the output AND's 811 through 820 for positions 1 through 10 respectively. The outputs from these ANDs through inverters Q1 through Q10 to terminals ASC–11 through ASC–20 are employed to ascertain the distance between the selected call and the cars, the free car distance for the cars and the intermediate stops for the cars all through application to allotter coincidence circuits ACC1 to 4 for each car and the total stops gating circuits TSG1 to 8 for each car. Coincidence of the scan position and effective car position in certain instances is correlated with the relationship between allotter scan direction and car service direction.

Thus, the intermediate stops counter for each car is enabled from the initiation of scan to the coincidence of scan position and car position when scan direction opposed car service direction. Allotter scanner scan direction is indicated to the associated equipment at terminal ASC25 as a positive up scan signal and a negative down scan signal and at terminal ASC26 as signals of inverse polarity.

Scanner advance is actuated by the scanning clock through driver 204D and lead 211 as controlled by means to be described. The scanner clock in inhibited until the allotter has been preset as to its scanner initial position and scan direction and until its counters are reset. Following preset, the clock is enabled and periodically issues negative pulses. The clock pulses are asymmetrical in that they have a longer dwell at the negative limit than at the positive limit. During the positive portion of the pulses, the binary transfers state and the readout of the scan in the counters is inhibited through the positive signal at ASC–24 to avoid spurious responses during the scan advance. Scan read occurs during the quiescent negative portion of the scan. In the example the clocking signals have a fifty millisecond cycle which is made up of a forty millisecond negative signal and a ten millisecond positive signal.

The positive signal from driver 204D is passed by the coupling condenser in lead 211 to OR's 196 and 197 wherein it is passed to both inputs of the binary flip-flop to transfer states therein, the resultant outputs on leads 198 and 199 are flat topped signals of fifty microseconds duration at the negative and positive levels. These signals leave a 180° phase relationship such that the even count AND's 812, 814, 816, 818 and 820 are enabled by a negative signal on lead 199 while the odd count AND's 811, 813, 815, 817 and 819 are inhibited by a positive signal on lead 198. In the following fifty microseconds lead 199 is positive and lead 198 is negative to inhibit the even count AND's and enable the odd count AND's.

The quinary stages having outputs from Q11 through Q15 are advanced in their condition in response to signals from the binary flip-flop as they appear on leads 198 and 199. The quinary stages are disabled through eight of the ten count positions such that Q11 is off for all but counts 1 and 2, Q12 is off for all but counts 3 and 4, Q13 is off for all but counts 5 and 6 and so on. The stages are cross inhibited through their count holding AND's 821, 822, 823, 824 and 825 respectively coupled to the outputs of every other stage but that which they control. Thus with stage Q11 "on" and stages Q12 to Q15 "off" positive signals from the outputs to each of Q12 to Q15 applied to the inputs of AND 821 gate that AND to pass a positive signal to OR 826 and hold Q11 "on." Conversely when any stage is "on," all other stages are "off" since the negative signal from its output inverter inhibits the hold AND's for the other stages with a negative signal as at input Q11 from inverter Q11 to AND's 822, 823, 824 and 825.

Transfer from quinary OR 826 to OR 827 and further transfers to OR's 828, 829 and 830 occur for every second advance pulse from the binary flip-flop as controlled by ascending scan transfer AND's 831 to 834 or descending scan transfer AND's 835 to 838.

Assume, for purposes of illustration that the scanner was preset at "1" so that the binary flip-flop issues a negative signal on lead 198 and a positive signal on lead 199 and so that the direction flip-flop issues a positive signal on lead 209 to inhibit the descending scan transfer AND's 835 to 838 and a negative signal on lead 210 to enable the ascending scan transfer AND's 831 to 834. OR 189 gated by the preset "1" pulse from ASC-1 applies a positive pulse to the positive input of inverter Q11 to turn that inverter and quinary stage "on." This inhibits all other quinary stages at holding AND's 822 to 825. The negative output from Q11 enables each of AND's 811 and 812. AND 812 is inhibited by the positive signal on lead 199 while AND 811 is gated by the negative signal on lead 198 to pass a "1" signal from Q1 to ASC-11.

On the next inversion on the binary flip-flop lead 198 becomes positive and lead 199 negative. AND 811 is thereby inhibited and AND 812 gated to Q2 which issues a "2" signal to ASC-12. At this time each of the down transfer AND's is inhibited by the positive signal on lead 209; up transfer AND's 832, 833 and 834 are inhibited by the positive signals from Q12, Q13 and Q14; and up transfer AND 831 is gated since a negative signal is imposed on each of its inputs from leads 199 and 210 and from Q11. AND 831 is thus cocked for transfer to the second quinary.

The third inversion of signals on leads 198 and 199 inhibits AND 831 causing a positive signal to be applied to transfer OR 839 and be passed by its coupling condenser to OR 827 and inverter Q12 of the second quinary stage. Inverter Q12 issues a negative signal to inhibit interlocking or holding AND 821 of the first quinary. Down transfer AND 838 is inhibited at this time by the positive signal in lead 209. Hence first quinary or 826 is inhibited and inverter Q11 is turned off. This inhibits output AND's 811 and 812.

With inverters Q11, Q13, Q14 and Q15 off, positive signals are imposed on each of the inputs to interlocking AND 822 to hold second quinary OR 827 gated and develop an enabling signal through inverter Q12 to AND's 813 and 814. The negative signal onl ead 198 gates AND 813 to Q3 for a count of "3." The positive signal on lead 199 inhibits AND 814 until the next inversion in the binary flip flop.

The fourth inversion of the binary inhibits AND 813 and gates AND 814 for a count of "4." It also cocks up transfer AND 832 by the negative signals on leads 199 and 210 and from Q12 so that on the next inversion by the binary a transfer pulse to third quinary OR 828 from transfer OR 840 turns Q13 on. Q13 inhibits all other quinary staegs and has its interlock AND 823 gated during the count for landings 5 and 6.

The advance of the scan in an ascending order continues until the scan position for the upper most landing is reached, AND 820 is gated to inverter Q10 in the ten landing example. The positive signal from Q10 inverts the direction flip flop by its connection of a branch of lead 842 to OR 207 and scan down set input of the direction flip flop. This sets lead 210 positive to inhibit all up transfer AND's 831 to 834 and lead 209 negative to enable all down transfer AND's 835 to 838.

When the scanner is set at the tenth position, binary imposes a negative signal on lead 198 and a positive signal on lead 199. No transfer AND is cocked for this position. The fifth quinary therefore retains control for the next inversion of the binary so that AND's 819 and 820 are held enabled by Q15 and the negative signal on lead 199 gates AND 819 to activate the "ninth" scan position while the positive signal in lead 198 inhibits AND 820.

Down transfer AND 835 for the fourth quinary stage is enabled by the negative signal on lead 198 and gated by the negative down direction signal on lead 209 and the negative input from Q15. When cocked in this manner, AND 835 transfers from the fifth to the fourth quinary stage on the next inversion of the binary. This transfer parallels those for ascending transfers. Lead 198 is positive and 199 negative. AND 835 is inhibited to apply a positive pulse through transfer OR 841 and the coupling condenser to fourth quinary OR 829. Q14 issues a negative signal to inhibit hold AND 825 thereby turning Q15 off. With quinarys Q11, Q12, Q13 and Q15 off, fourth quinary hold AND 824 is gated to OR 829. Inverter Q14 thus enables AND's 818 and 817. Since lead 198 is positive AND 818 is gated for the eighth scan position. Negative lead 199 inhibits AND 817 until the next binary inversion.

Reversal of scan at the lower limit of scan positions is accomplished in the same manner as at the upper limit. As the first scan position is activated, a positive signal from Q1 is passed by a branch of lead 843 to OR 208 coupled to the up scan direction set input of the direction flip flop to impose a positive signal on lead 209 and a negative signal on lead 210. This enables the up transfer AND's and disables the down transfer AND's so that inversions in the binary cause transfer of scan position in an ascending sequence as described above.

A preset at terminals ASC-1 to ASC-10 is passed to an OR which enables the appropriate quinary stage of the scanner while a second OR presets the binary flip flop to enable the odd or even binary stage associated with the quinary stage of the counter. OR's 189 to 193 are respectively connected to apply a positive signal to inverters Q11 to Q15 respectively. For example, a preset 8 from CM8-1 to ARC-8 to ARC-18 to ASC-8 activates OR 192 and inverter Q14. This preset also presets the even binary stage associated with Q14 by passing a positive signal to OR 194. An odd value of preset is passed to OR 195. The binary flip flop has a set OR 196 and a reset OR 197. OR 194 sets the flip flop through OR 196 to issue a negative going signal on lead 199 and a positive signal on lead 198. Thus with inverter Q14 active and the remaining inverts inactive so that only the pulse position output AND's associated with Q7 and Q8 are effective the positive signal on lead 198 inhibits the AND for Q7 and the negative signal on lead 199 enables the AND for Q8 to issue a preset positive signal for the eighth position or landing at ASC-18.

The OR's 194 and 195 also enable the scanning direction to be set through OR 200 which fires the one shot multivibrator labeled "monostable" to cause the brief issuance of a negative signal on output 201 and a positive signal on output 202. This preset signal from the monostable has a duration of 40 to 50 microseconds and is terminated before the pulse on the preset inputs from the allotter rescan circuit is terminated. Direction setting AND's 203 and 204 are enabled by the brief negative signal on lead 201.

Ring counter gating establishes the scanning direction at terminals RCG-45 and RCG-46 such that a negative signal is issued at RCG-46 when a down call is to be allotted and a negative signal issues at RCG-45 for an up call. AND 203 for up calls is gated from RCG-45 to ASC-47 to set the scanner for an initial descending direction during the gating pulse from the monostable. AND 204 for down calls responds to a negative signal from RCG-46 through ASC-45 to cause an initial scan in the ascending direction. Inverters 205 and 206 apply a positive pulse signal to OR's 207 and 208 through blocking condensers which are passed to the set and reset inputs of the direction flip flop. OR 208 to the set input of the direction flip flop, when issued a positive signal causes the direction flip flop to set the counter to advance in an ascending direction by issuing a positive signal on lead 209 and a negative signal on lead 210 for an ascending count. Similarly when OR 207 is on it resets the direction flip flop to cause the counter to advance in a descending order by imposing a negative signal on lead 209 and a positive signal on lead 210.

In an ascending setting the count advances between quinary stages each cycle for the binary flip flop and from odd to even stage of the section controlled by the active quinary stage for inverters Q1 through Q10 for each half cycle of the flip flop. A descending setting reverses the sequence of the quinary stages causing the advance from Q15 to Q11 and upon the inception of conduction in each pair of binary stages controlled by a quinary stage, operates the even stage in the first half cycle of flip flop 178 and the odd stage in the second half cycle.

If the assumed call had been a down landing call for the eighth landing the counter is set to initially scan upward from position 8 (ARC–18) by a positive signal at ASC–8 and a negative signal at ASC–45. When the tenth position is reached a positive signal from Q10 is applied to OR 207 at its upper input to reset the direction flip flop whereby the counter scans downward from Q10 to Q1. When the first position is reached the signal from Q1 is applied to the lower input of 208 to set the counter to an ascending scan.

Scanning continues while the free running multivibrator labeled "scanning clock" continues to run and apply pulses to lead 211 feeding the binary flip flop. The clock operates when the positive inhibit signal on lead 212 is removed by disabling OR 213. It is started upon the termination of the direction set signal on lead 201 from the monostable and is inhibited during the reset of the allotter and its associated elements. The clock operation is continued until a scan cycle is completed as signified as a positive signal at ASC–38.

The allotter and its associated circuits are reset during the pulse from the monostable circuit. Normally a negative signal is present on lead 202 and a positive signal is on lead 201. During the firing interval of the monostable circuit the signal polarities are reversed. The positive signal on lead 202 to terminal ASC–39 is applied to reset the counters in the intermediate stops counter at ISC–3, the free-car distance counter at FDR–3, and the distance counter at AGC–13. Resetting of the distance counter DC cancels the count of eighteen which terminated the preceding allotter scan and removes the positive "eighteen count" signal from terminal AGC–24.

While the "eighteen count" prevails, the scanning clock is inhibited. A positive signal at ASC–38 inhibits AND 214 so that inverter 215 gates OR 213 to impose an inhibit signal on the scanning clock over lead 212. During the allotter reset and while the monostable is inverted, the reset of the "eighteen count" does not remove the inhibit from the scanning clock since the negative signal from the monostable on lead 201 to OR 213 maintains that OR gated. At the termination of the monostable reset signal lead 201 returns positive and since the "eighteen count" signal has been cancelled OR 213 is inhibited to remove the inhibit on the scanning clock.

The inhibit of the scanning clock is locked out during an allotter scan by gating AND 214. During the reset by the monostable, OR 216 is gated by the positive signal on lead 202. The resulting negative signal from inverter 217 to AND 214 in coincidence with the reset of the "eighteen count" signal gates AND 214. Inverter 215 latches OR 216 to hold AND 214 gated until another "eighteen count" signal is applied at ASC–38 to inhibit AND 214 and the scanning clock.

The distance counter of the allotter gating circuit AGC of FIG. 14 is driven in synchronism with the scanner by pulses derived from the scanning clock through driver 204D and ASC–24 which is connected to AGC–1. This counter will be discussed in detail below.

In the allotter scanning process the direction flip flop is reversed at the initiation of the terminal scan interval. Thus, when the scanner is stepped to a count of 1 the ring counter is set to the up direction even though the first position is included in the scan downward and a scan reversal should be considered to occur only as the scan transfers from the terminal to the next adjacent position. The ring counter reversal is therefore considered to occur one scan step in advance of the reversal of the scanning reference direction.

Scanning reference direction is significant in the free-car distance counter logic. Free-car distance is measured as the absolute distance of a free-car from the call. Accordingly, if the free-car is encountered in the initial portion of the scan, that preceding the first reversal of the scanning reference direction, the free car distance can be measured as the number of scan steps from the initiation of the scan to the coincidence of the scan with the free car lead position. The scan between the first and second reversals of the scanning reference direction is not utilized in the free-car distance measure. If the free-car is encountered after the second reversal of scan, its distance from the call is measured by the number of scan steps from the location of the car to the return of the scan to its initial position.

A reversal of scan circuit involving portions of the alloter scanner circuit and the allotter gating circuit AGC of FIG. 12 is employed to issue a signal for no reversal of scan during the initial scan and up to the first reversal of the scanning reference direction and to issue another signal upon the second reversal of the scanning reference direction in order to control the free-car distance counter of the car locating and gating circuits CLG1 and CLG2. Reversal of scan circuits in the allotter gating circuit receive information by coupling ASC–25 to AGC–16, to pass a negative signal for up allotter ring counter direction and a positive signal for down allotter ring counter direction. Similarly ASC–26 is coupled to AGC–15, to pass a positive signal for down allotter ring counter and a negative signal for down allotter ring counter direction. The terminal landings in the scan are assigned to the direction of scan which achieved the terminal position as a down scanning reference direction for the bottom terminal and an up scanning reference direction for the top terminal by a positive signal at ASC–41 during the down scanning reference direction and a positive signal at ASC–42 during the up scanning reference direction.

OR 218 is gated while the allotter ring counter is set for a descending count and while the first position of the scanner is active. Each of these conditions impose a positive signal on an input to OR 218 resulting in the enabling of AND 219. AND 219 is gated by OR 218 except when inhibited by the cross inhibit from the up scaning reference direction circuit. AND 219 issues a positive signal which is inverted by inverter 220 and again by inverter 221 to pass a positive signal to terminal ASC–41 during the interval the down scanning reference direction is maintained.

OR 222 is gated while the allotter ring counter is set for an ascending count to apply a positive signal to its lower input, and while the upper terminal position of the scanner is active to provide a positive signal on its upper input. AND 223 is gated by the gated OR 222 and the absence of a cross inhibit signal from inverter 220. The cross inhibits between AND's 219 and 223 enable the scanning reference direction to be maintained until the count has advanced from a terminal position. Thus if an up direction were set in the ring counter OR 222 would be gated. When the tenth scan position is achieved the down direction is set in the ring counter; however, the OR 222 would continue to be gated and would hold AND 223 gated so that it inhibited AND 219 even though OR 218 is also gated at this time. Thus while the ring counter is set for up and at other than the lowest scan and while the scan is at its highest, a positive signal is issued from inverter 224 to terminal ASC–42. Conversely when the ring counter is set for down and at other than the highest scan and while the scan is at its lowest, a positive signal is issued to terminal ASC–41.

Classification of the calls as to their direction and correlation of the scanning reference direction thereto is utilized in the total stops gating circuits typified by TSG1 and TSG2 for car 1 for counting intermediate stops. OR's 225 and 226 provide signals to the total stops gating circuits for both intermediate stops counting and total stops gating. Intermediate stops counting is accomplished in synchronism with the allotter scan by sensing each coincidence of a scan position with a call assigned the car for that position and by serially counting those coincidences. Total stops counting is accomplished at the end of the scan by enabling all calls assigned the car to be counted. OR 225 is gated during the period of down scanning reference direction by the positive signal from inverter 221 and OR 226 is gated during the period of up scanning reference direction from inverter 224 to provide intermediate stops count control. Both of OR's 225 and 226 are gated at the end of the scan by the positive "eighteen count" signal applied to ASC–38 and passed over lead 227. While OR's 225 or 226 are gated a negative signal is issued at ASC–21 and ASC–22 respectively to enable the AND gates of the total stops gating circuits of FIG. 6 as will be described.

DESCRIPTION OF FIG. 5

Each car is provided with an allotter coincidence circuit which responds to a coincidence of the scan position and the effective or lead position of the car to aid in locating the car with respect to the call. FIG. 5 illustrates in detail the allotter coincidence circuit for car 1, ACC1, and represents by the dot-dashed rectangles labeled ACC2, ACC3 and ACC4 the allotter coincidence circuits for cars 2, 3 and 4.

The allotter coincidence of scan position and effective car position is sensed by a series of AND circuits one for each scan position or landing as 228 to 237 for landings 1 to 10 respectively in the illustration. Each AND has two inputs and is responsive to a coincidence of positive signals thereon. The lower input is from the scanner outputs ASC–11 to ASC–20 for positions 1 to 10 respectively. The upper input is an effective car position derived from the apparatus of the aforenoted car control U.S. patent application Ser. No. 380,385 or from conventional floor selector machines. Such inputs are termed "lead positions" to signify the current position at which a car is capable of stopping. They are designated here and at other points where they are utilized as LP–1 through LP–10 for landings 1 through 10. The coincidence of a lead position and a scan position gates the AND for that position to issue a positive signal to OR 238. That signal is inverted by inverter 239 to appear at ACC1–1 as a "car found signal." During the scanning cycle similar "car found signals" are issued from ACC2–1, ACC3–1, and ACC4–1 as cars 2, 3 and 4 are located by the coincidence of the scan position and their respective lead positions.

DESCRIPTION OF FIGS. 6 AND 7

The allotter develops an analog signal representing the total number of stops each car must make. Total stops gating circuits TSG1 and TSG2 shown in FIGS. 6 and 7 are typical for ascertaining the total stops for car 1 and correspond to circuits TSG3 and TSG4 for car 2, TSG5 and TSG6 for car 3 and TSG7 and TSG8 for car 4.

Total stops gating circuits also provide signals to intermediate stops counter ISG of FIG. 8 to count the number of stops each car must make between its position at the time the allotting takes place and the location of the call being allotted. Thus the sensing of the total stops is synchronized with the allotter scanning whereby the intermediate stops are serially applied to the intermediate stops counter.

Total stops are sensed broadside by AND circuits which are responsive to the gating of OR's 225 and 226 at the end of a scan and to the activated individual demand memories. In the example these coincidence circuits are grouped in five landing modules.

Total stops gating circuit STG1 accommodates the up and down demands for car 1 for landings six through ten while circuit TSG2 accommodates landings one through five for that car. The demand memories (not shown) issue negative signals at their −6 terminals when an up demand or a command is registered for their landing and issue negative signals at their −18 terminals when a down demand or a command is registered for their landing. Accordingly all calls assigned a car are indicated by these outputs from its demand memories. The up demand memory outputs appear as negative signals at the upper inputs of up AND's 241 to 249 for landings 1 to 9 in FIG. 6. Down demand memory output signals are applied to the upper inputs of down AND's 252 to 260 for landings 2 to 10 in FIG. 6 AND's 241 to 249 and 252 to 260 are employed in the serial counting of intermediate stops by combining their gated signals with allotter scan position signals in the circuits of FIG. 7. They are also employed in the broadside gating of the total stops register to output resistors 271 to 280. These grouped AND's are inhibited and enabled by signals common to each group and derived from the allotter scanning circuit at ASC–21 and ASC–22. While the scanning reference direction is set for an ascending scan a negative signal is passed from ASC–22 to TSG1–17 and TSG2–15 to enable all of down AND's 252 through 260. Any down demand registered in the demand memories of car 1 will impose negative signals on those AND's and result in a negative output to the OR of the series 262 to 269 for landings 2 to 9 corresponding to the landing of the registered demand. The OR's 262 to 269 respond to up and down demands for the landings and issue a negative output in response to either. Thus, when the allotter scanner reference direction is set in a descending direction, a negative signal is present on TSG1–15 and TSG2–17 and all AND's 241 to 249 for which up demand memories are operated pass a signal to appropriate OR's of the group 262 to 269.

All up and down memories which are active cause negative signals to be applied to inverters for landings 1 to 10 which in turn develop positive signals.

FIG. 7 is coupled to FIG. 6 through the vertically extending leads 281 to 290 coupled to the output of the inverters from AND's 241 to 260 and OR's 262 through 269. In accordance with the scanner sequencing, leads 281 and 290 can each be activated over one portion of the scan interval provided an up first demand memory or a down tenth demand memory is registered. Leads 282 to 289 can be activated over either or both of the up and down scan portions since they respond to both up and down demand memories for the second through ninth landings. A positive signal on any of leads 281 to 290 enables a corresponding AND 301 to 310 in FIG. 7 when the allotter scanner is on the position corresponding to that AND and applies a positive signal to its other input through TSG1–1 to TSG1–5 or TSG2–1 to TSG2–5. Thus the AND's 302 to 309 can be activated twice during each scan if both up and down demands are registered for the landing to which they correspond.

Each response of an AND 301 to 310 represents a call registered in a demand memory. Since both commands and demands are registered in a demand memory, as will be discussed below, the several responses during the allotter scan serialize the calls to which the car must respond by positive signal pulses appearing at OR's 311 and 312. These pulses are inverted by inverters 313 and 314 and passed from TSG1–24 and TSG2–24 to intermediate stops gating circuit ISG at ISG-1 and ISG-2 respectively. They are combined at OR 315 gated through AND 316 from the initiation of the allotter scan until the car found and an inhibit signal is imposed from car locating and gating circuit CLG1 as a positive signal from CLG1-11 to ISG-3. AND 316 is enabled in synchronism with the allotter scanner clocking to avoid spurious signals by enabling negative pulses from ASC-24 to ISG-18. AND 316 issues a pulse through inverter 317 at ISG-18. AND 316 issues a pulse through inverter 317 at ISG-4 for each demand memory in which a demand or command is registered and which is encountered in the allotter scanning operation between the initiation of scan and the location of the car thereby producing a number of pulses corresponding to the number of stops required for the car before it can reach the call being allotted.

The intermediate stops gating circuit includes sections gating stops for each of the four cars as indicated by the dashed lines sectioning the dot-dashed rectangle labeled ISG in FIG. 7. "Car found" signals are supplied these gates for cars 2, 3 and 4 at ISG-7, 11 and 15. Scanner clock synchronization is through the paralleled connections represented by arrow-headed lead 318. Inputs from the total stops gating circuits (not shown) for cars 2, 3 and 4 are applied at ISG-5 and 6, 9 and 10, and 13 and 14 respectively in the same manner as at ISG-1 and 2.

The output of each car's gate at ISG-4, 8, 12 and 16 for cars 1 to 4 is applied to an intermediate stops counter ISC individual to the car as typified for car 1 in the rectangle shown in FIG. 7. This counter can conveniently be of the binary type comprising four flip flop stages in the present system of ten landings. If a greater number of landings were present additional stages could be added, although in the present system the capacity to count fifteen intermediate stops is considered adequate. The binary counter has not been shown in detail since its form and equivalent counters are well known. For car 1 the counter has an advance input ISC-24 from intermediate stops at ISG-4. A reset prior to each allotter scan is applied to the intermediate stops counter at ISC-3 to set the count to zero. Each counter stage has an output in accordance with conventional binary counting for a count of one at ISC-23, two at ISC-22, four at ISC-21, and eight at ISC-20. In order that a binary to analog addition can be accomplished to apply a signal to the analog summing lead 300 which is characteristic of the number of intermedaite stops, the signals from the counter are applied to resistances having values weighted in accordance with the count they represent. For example if a strict signal relationship is desired for the intermediate stop count factor the resistance 319 for the one count output should be of a magnitude eight times that of resistance 321 for the eight count output. Similarly the two count output resistance 322 should be four times the resistance 321 and the four count output resistance 323 should be twice that of resistance 321.

The total number of stops assigned a car is ascertained at the end of the scan by broadsiding all of the activated demand memories to output resistances 271 to 280 of FIG. 6. As described with respect to the allotter scanner of FIG. 4, upon the termination of the scan OR's 225 and 226 are both gated to issue negative signals from ASC-21 and ASC-22 to terminals TSG1-15 and 17 and TSG2-15 and 17 whereby all of AND's 241 through 249 and 252 through 260 are enabled. Those AND's to which activated demand memories are connected are gated at this time so that the resistances coupled thereto through terminals TSG1-18 to 25 and TSG2-18 to 25 are grounded and draw current to represent the analog signal from summing lead 300 for the total number of stops imposed upon that car.

In regard to the signal weights to be given each factor considered in the allotting decision, it is to be understood that the weighting can be arbitrary. That is, for example the total stop count signal might be made up from identical signal levels for each landing represented so that each of resistances 271 to 280 are of identical magnitude. Alternatively the resistances for the terminal landings, resistances 271 and 280 might be half the magnitude of each of the other landings in order to give those landings double the weight attributed to demands registered for the landings intermediate the terminals.

DESCRIPTION OF FIG. 8

Each car is provided with a car locating and gating circuit as shown in FIG. 8. This circuit includes the means for comparing the summed signals for the various factors which are incorporated in the decision making evaluation of each car's service capability with respect to the call which is being allotted and for issuing the car assigned signal if the call is to be allotted to the car. It also gates the advance of the scan position to coincidence with the lead position of the car whereby the distance register gating circuit for the car is latched as is the intermediate stops gating and the free car distance register.

Much of the information utilized by the car locating and gating circuit is derived from the allotter scanning circuit and the allotter gating circuit while its effective summed signal is compiled by an operational amplifier of FIG. 10 which in turn is supplied by the total stops gating circuits TSG1 and TSG2, the intermediate stops counter ISC, the distance register gating circuit DRG, the free car distance register FDR and a car load sensing circuit all of which supply lead 300.

A number of signals applied to and derived from the car locating and gating circuits of car 1 are common to those circuits for the other cars. Thus in the decision making operation of the allotter a ramp signal is applied to each car's locating and gating circuit simultaneously as is a start ramp signal. The eighteenth pulse of the allotter scanner is also applied to the circuits of all cars as are the call direction signal, the allotter preset signal, the allotter reference scan direction signals and the reversal of allotter scan signals.

A car located signal is issued as a positive signal at CLG1-11 when a car lead position coincides with the allotter scan position and the allotter scan is in the proper direction. This signal is passed to ISG-3 to latch the intermediate stops gating whereby the effective number of calls between car location and demand being allotted is ascertained. In order that the calls be restricted to those which are effective the scan follows the circuit of the car travel. Thus for an up call the scan is directed from the call downward searching for an up car; once the lower terminal has been scanned, the scan is upward beginning at the second landing and the search is for a down car; when the upper terminal is achieved the scan again reverses and proceeds downward from the ninth landing to the landing above the call being allotted while the search is for an up car. An inversion in scan and search response is utilized for a down call. Thus the car best suited to respond is a down car above the call found by an initial scan upward, the next most favorable positioned car is an up car near the top of the travel hence a scan downward seeking an up car is undertaken and the third category of car position and direction is a down car below the down call encountered by an up scan from the second landing and responsive to a down setting for the car.

The separation of a car from the call also relies upon the scanning circuit described above. That is, it counts each landing at which the car might stop in running from its current position and in the direction it is currently providing service. If a down call were registered at the eighth landing and the car were traveling upward at the seventh landing the distance register gating circuit would be enabled when the allotter scanner count was at five since the scanner would step to landings nine and ten on an ascending scan and then landings nine, eight and seven on a descending scan. At the coincidence of the scan and car lead positions, the car locating and gating circuit inhibits the scan counter of the distance register gating circuit, so that that count is available to produce a distance count contributing to the summed analogue signal of the car service capability.

According to the present system a car having no service requirements imposed upon it yet available for service is considered to be particularly well situated to serve a call being allotted. Such a car is termed a "free car." It has no direction setting and therefore can be set according to the requirements of a call allotted to it. The above outlined circular scan is therefore not required in ascertaining the separation of a free car from a call to be allotted. However, in order to maintain compatibility with the allotter scanning system utilized, elements of that scan are employed in evaluating the availability of a free car to serve the call being allotted. Since only the absolute separation of the call from the free car is of interest, the initial portion of the scan up to the first reversal of scan is utilized in the car hunting and the landings scanned between the call and car are counted by the distance register gating circuit for the car if the car is encountered. Following the first reversal of scan the counting for free car distance purposes is suspended. Upon the second reversal, absolute separation of car and call is again ascertainable by initiating the scan position count in a free car distance counter for the car upon coincidence of that count and the free car lead position and continuing the count to the termination of the scan at the landing adjacent that of the call being allotted. Thus for a down call free car distance circuits are effective only during the ascending scan before the first reversal and after the second reversal while for an up call they are effective only during the descending scan before the first reversal and after the second reversal.

Car locating relies upon the relationship of the allotter scanning direction to the service direction assigned to the car. A down scanning reference direction is signified by a positive signal from ACS-41 applied to CLG1-19 while the up scan is signaled from ACS-42 to CLG1-21. The car service direction from car 1 car control circuit CC is indicated by a positive signal from SSL-31 to CLG1-20 for an up car and from SSL-32 to CLG1-22 for a down car. Coincidence of an up reference scanning direction and a down service setting of the car is sensed by AND 324 which activates OR 325 through inverter QB. Conversely, a down scan and an up service setting of the car passes a signal through AND 326 and inverter QA to OR 325. OR 325 therefore passes a signal when the scan direction is compatible with the car service setting for assignment of the car.

The coincidence of lead position for a car having a service direction compatible with the scan with the scan position is employed throughout the scan for an active car as the means for marking the distance of the car from the call and the intermediate stops count. This coincidence is also used for a free car to mark its distance from the call prior to the first reversal of scan if the free car is ahead of the call, or after the second reversal of scan if the free car is behind the call.

The signal from OR 325 is inverted by QC and applied to AND 330 to enable that AND to pass a signal through inverter QE to OR 327 in the event car 1 is not a free car. A free car is signified by a positive signal from SSL-2 to CLG1-12. Thus a negative signal through OR 328 indicates the car is not in the free car status and the inversion at QD enables AND 330. During the initial portion of the allotter scan a negative signal issues from AGC-18 to CLG1-18. Upon the first reversal of scan that signal becomes positive to inhibit OR 328 and AND 330. If car 1 is a free car, or 328 inhibits AND 330 upon the first reversal of the allotter scan. Thus if the car service direction and the direction of scan are related so that it can be located and if the car is not a free car or if it is a free car but the first reversal of scan has not occurred a signal will be applied to the upper input of OR 327, inverter QG and the upper input of AND 329.

The positive free car signal at CLG1-12 enables AND 331. During the terminal portion of the allotter scan, that following the second reversal of scan direction, a positive signal is applied from AGC-20 to CLG1-13 and to the lower input of AND 331 so that a signal is passed through inverter QF to OR 327, inverter QG and AND 329. Thus the upper input to AND 329 is inhibited for a car when it is not suitably conditioned relative to scan direction for asisgnment and in the case of a free car between the first and second scan reversals.

Coincidence of car lead position and allotter scan position when sensed in the allotter coincidence circuit of FIG. 5 is indicated by a negative signal at ACC1-1 to CLG1-16 and the upper input to AND 332. The allotter scanner clock issues from ASC-24 inhibiting positive signals during its advance to avoid false responses. These signals applied at CLG1-14 are applied to the lower input of AND 332 so that that gate will pass a signal only during quiescent conditions of the car lead position-scan position coincidence. When the signal is passed, it activates OR 333 and, through inverter QH, appears as an enabling signal on the middle input of AND 329.

During the active portion of the allotter scanner cycle the reset terminal ASC-39 issues a negative signal to CLG1-17 which is inverted by QO to an enabling signal applied at the lower input of AND 329. Upon reset of the allotter scanner an inhibit signal is applied to AND 329 by this circuit. Thus during an active scan, when the scan position coincides with the car lead position, and when the scan is in a proper relationship to the car service condition to assign the call AND 329 passes a signal through inverter QI to latch OR's 327 and 333 over lead 334, and through inverter QJ to the car located output CLG1-11, and inputs of AND's 335, 336 and 337.

The positive signal at CLG1-11 is passed to ISG-3 of FIG. 7 to inhibit AND 316, thereby stopping the accumulation of counted calls in intermediate stops counter ISC. AND 335 enables a latch signal to the distance register gating circuit DRG when activated. AND's 336 and 337 enable an advance signal for the free car distance register FDR. When the car is not in its "free car" status the negative signal at CLG1-12 is inverted by inverter QS to an enable signal to AND 335 so that a signal from AND 335, inverted by QM activates OR 338, which passes an enable signal to AND 339 through inverter QN. AND 339 passes the "active car located signal" provided the allotter scanner is not being reset, since the negative signal from ASC-39 to CLG1-17 is inverted by QO and applied to its lower input. The positive signal from AND 339 is inverted by inverter QP and employed to latch OR 338 to hold the signal until the allotter scanner is reset. It also inhibits AND 337 and is issued at CLG1-15 to DRG-11 to the distance register gating circuits DRG.

OR 338 can also be activated by AND 336 when a free car is found by the allotter prior to the first scan reversal so that AND 339 is operated until the allotter scanner preset inhibits it. This also issues a signal to the distance register gating and an inhibit to AND 337.

AND 337 when gated passes advance signals to free car distance register as positive signals inverted twice in QQ and QR and then issued from CLG1-10 to FDR-24. Five coincident conditions are required to gate AND 337: (1) no car located signal should be issued from AND 339 for either a found "active car" or a "free car" found prior to the first scan reversal; (2) two scan reversals must have occurred during the current scan cycle to impose a positive signal at CLG1-13; (3) a car located signal must be issued by AND 329; (4) the car must be a free car; and (5) the scan advance must be completed by the scanner clock to issue a positive signal to CLG-14. Since the scanner clock alternately imposes an inhibit and a gating condition on AND 337, upon the coincidence of all other conditions, AND 337 applies advance pulses to the free-car distance register gating circuit until the scanner is reset whereby the counter in that circuit is advanced to count the number of landings between the position of the free car and the location of the call to be assigned.

The upper portion of the car locating and gating circuit shown in FIG. 8 including circuits associated with terminals CLG1-1 to CLG1-9, CLG1-25, CLG1-26 and CLG1-47 is concerned with the control of the assignment of a call to the car. As will be discussed, a ramp signal which increases generally linearly with time is employed as a standard against which all summed service capability signals are compared simultaneously. When coincidence is achieved between a summed signal and the ramp, the car of that signal is assigned the call currently under consideration by the allotter. The ramp is generated in a section of the intermediate stops gating module of FIG. 9 and issues from ISG-19 to CLG1-2, and to the comparator of each car. That signal is passed to comparators other than that of car 1 on lead 341. The sum signal to the comparator of car 1 is supplied by an operational amplifier shown in FIG. 10 connected to CLG1-1. Similar sum signals are supplied to each car's comparator from that car's signal summing circuit and operational amplifier.

When a coincidence in the level of the sum signal and the ramp signal occurs, a negative signal is developed by the comparator and applied to OR 342 and through inverter QT to AND 343. A start ramp signal developed in the allotter gating circuit AGC of FIG. 12 as a negative signal is applied from AGC-11 to CLG1-3 for all cars. It is applied to OR 344 for car 1 and by lead 345 to similar ORs for each of the other cars. OR 344 issues an enabling signal to AND 343 through inverter QSS in response to this start ramp signal. When the allotter scanner has advanced a number of positions equal to the number of landings to be scanned (twice one less than the total number of landings) and has completed a scan, allotter gating circuit AGC issues a positive signal at AGC-24 to CLG1-4 and AND 343. If the car is not unavailable for the reception of a call assignment, as where it is not overloaded to apply a positive signal to CLG1-25 or is not parked at the main or lobby landing to apply a positive signal at CLG1-26, OR 343A applies no inhibit signal through inverter QAA to the upper input of AND 343. AND 343 latches ORs 342 and 344 through inverter QU and issues a "car assigned" signal as a negative signal at CLG1-5 connected to the allotter gating circuit at AGC-7.

The call under consideration by the allotter is assigned to the appropriate demand memory of car 1 by the positive enabling signal from the car locating and gating circuit at CLG1-8 for an up call and CLG1-9 for a down call. These signals are derived from AND's 346 and 347 respectively for up and down calls. Each of these AND's requires a "car assigned" signal at its upper input and a call finder ring counter inhibit signal at its middle input to indicate no further advance by the ring counter as derived from AGC-22 and applied to CLG1-47 and RCG-41. If the landing call under consideration is an up call, AND 346 is gated by these conditions by the positive enabling signal from ASC-45 to CLG1-6 and the lower input of AND 346 to issue a signal to CLG1-8. If it is a down call, AND 347 is enabled under these conditions by the positive signal from ASC-47 to CLG1-7 to issue a signal to CLG1-9.

An interlock is provided between the ring counter and the allotter to prevent the allotting of a call while the ring counter is hunting a call and to prevent the ring counter hunt while the allotter is functioning. The input at CLG1-47 provides this interlock in the allotter call assignment function by imposing a negative signal to inhibit AND's 346 and 347 untl the allotter scanner preset is completed. This inhibit signal is developed in the allotter gating circuit AGC of FIG. 12 at AGC-22 in response to conditions in the ring counter gating circuit at RCG-20 and in the allotter scanner circuit at ASC-39. The AGC circuit is arranged to gate a negative OR 417 over an interval beginning with the "call to be found" signal in the RCG circuit and remaining until the allotter scanner preset is concluded and the allotter scan initiated in the ASC circuit.

It should be noted that the "distance count" signal indicative of the completion of an allotter scan is applied to an AND for each car corresponding to AND 343 by means of lead 348. The call finder ring counter advance signal is passed to the other cars on lead 349. The up or down nature of the call being allotted is indicated to the other car's CLG circuits by leads 351 and 352. Allotter scan direction is conveyed to each car's CIG circuits by leads 353 and 354 while the "zero reversals of scan" and "two reversals of scan" signals are passed to the other car's CLG circuits by leads 355 and 356. All other cars receive "allotter scanner reset" signals over lead 357 and "allotter scanner clock advance" signals over lead 358.

DESCRIPTION OF FIGS. 9 AND 10

After the scan has been completed, a "start ramp" signal is applied to the ramp generator of FIG. 11 at ISG-23. This signal is negative and maintained until a car is assigned. During the maintenance of the signal the output at ISG-19 increases with time. This signal source is common to all cars. It is arranged to develop an essentially linearly increasing level with time determined in accordance with the time constants of the circuit including condenser 358 and resistances 359 and 361.

The sum signal from the several service capability evaluation circuits as combined on lead 300 are matched to the comparator of the car locating and gating circuits typified in FIG. 8 by an operational amplifier 371 which supplies the comparator through CLG1-1. The input signal on lead 300 is a sum of currents derived from sources of fixed voltage through resistances selected in accordance with the weight to be attributed to the service capability evaluation factors and the degree of significance of the several levels for each factor. Thus as discussed with respect to the total stops gating circuits TSG1 and TSG2 and the intermediate stops counter ISC of FIGS. 6 and 7, resistances of various magnitudes are coupled to lead 300 to add current in an amount indicative of the weight to be given those factors. Similarly, as will be discussed the distance register gating circuit of FIG. 11 is capable of adding current to lead 300 in an amount dependent upon the number of landings between the car and the call.

The operational amplifier 371 responds to the changes in current on lead 300 through the negative feedback provided by resistances 372 and 373 such that its output tends to maintain a constant voltage at input 374. The remaining terminals are the supplies for the amplifier as indicated by the legends −24 v., COM., and +24 v.

The separation of a free car from the landing of the call to be assigned is introduced as a factor by the free car distance register FDR of FIG. 10. That circuit is a four stage binary counter in the ten landing system under consideration since the maximum count which it might sense is nine. The counter is of conventional form and therefore has not been illustrated. Further, alternative forms of known counters might be employed. As described with respect to the car locating and gating circuit, the free-car distance register receives driving advance pulses from CLG1-10 to CDR-24, if its car is a free-car, if the free-car is not located prior to the first scan reversal, and if the scan has advanced to the second reversal, between the scan position at which the car is located and the termination of the allotter scan. The count accumulated is represented in the usual binary manner as current through resistances 375, 376, 377 and 378 connected between terminals FDR-23, FDR-22, FDR-21 and FDR-20 and lead 300 for counts of 1, 2, 4 and 8 respectively. In order to properly reflect as current level contributions on lead 300, the resistances 375, 376, 377 and 378 are related in a proportion inverse to the count they represent as eight, four, two and one times the resistance of 378 respectively. Reset of the free car counter at the initiation of an allotter scanner function is accomplished by a positive signal from ASC-39 to FDR-3 and the reset of each counter stage.

Free car distance is measured in the distance register gating circuit of FIG. 11 when the free car is located before the first scan reversal as described with respect to FIG. 8. A preference for the assignment of calls to free-cars over active cars is inherent in the system since by definition a free-car has no calls assigned and normally has no load applied. As among free-cars, that free-car closest to the call either above or below the call will have a preference in assignment.

Car loading is also significant as a factor for evaluating service capability. While a number of techniques are known for ascertaining car loading including passenger counters, loading distribution over the cab floor, photoelectric scanning of the cab interior, and weighing the cab structure, the latter technique has been chosen for purposes of illustration. Load switch 379 is of conventional form and may be located between the cab and sling for the car. It responds to several levels of loading of the car by transferring grounded movable contact 381 to contact 382 for a 50% of capacity load, 383 for a 75% of capacity load, and 384 for a full load. Since the loading is cumulative on the load switch, the resistances 385, 386 and 387 are connected to lead 300 in parallel and are representative of the effect of the next increment of load upon the service capability of the car. In one utilization resistance 385 for the increment from 0 to 50% of capacity is approximately one-half that of resistances 386 and 387 so that it has twice the effect on the current as the other resistances of the group.

DESCRIPTION OF FIG. 11

Another factor incorporated into the analog signal addition on lead 300 is the spacing of the car from the call being allotted. This signal is developed in FIG. 11 by the distance register gating DRG based upon signals derived from the distance counter DC to be described with FIG. 12. The distance register gating responds upon location of a car providing normal service or a free car located prior to the first reversal of the allotter scan to record for the allotter the number of scan steps counted from the call location to the car location. This information is gated at the time the car is located and the gates are latched throughout the remainder of the allotter operation by DRG. Each car has a DRG circuit.

The distance counter DC in the present example is a five stage binary counter which has outputs for the counts of 1, 2, 4, 8 and 16 at AGC-2, 3, 4, 5 and 6 respectively. These are coupled to the distance register gating at DRG-1, 2, 3, 4 and 5 for counts 1, 2, 4, 8 and 16. Two AND gates are provided for each count level. The first AND's respond to the initial "car located and conditioned for distance counting" signal as issued at CLG1-15 as a negative signal which is sustained until the allotter is reset. This signal is passed by blocking capacitance 388 and inverter 389 to enable any of AND's 391 to 395 having a count signal from DC. For a one count, for example, AND 391 gates a positive signal to OR 396 and inverter 397 to AND 398. AND 398 sustains the count developed at the time the car is located even though the distance counter DC continues to advance its count to the end of the allotter scan since the "car located signal" at DRG-11 is sustained at its lower input and a latch signal is provided through inverter 399, back to OR 396. Thus the output resistances 401, 402, 403, 404 and 405 between terminals DRG-6, 7, 8, 9 and 10 and analog signal summing lead 300 for counts of 1, 2, 4, 8 and 16 respectively, are grounded to provide the current drain appropriate for the distance count. As in previous analog signal generating resistances the magnitudes of resistance relative to the 16 count resistance 405 are twice, four times, eight times, and sixteen times for counts of 8, 4, 2 and 1 respectively.

DESCRIPTION OF FIG. 12

The allotter gating circuit AGC shown in FIG. 12 is common to all cars. It supplies the "start ramp" signal for the ramp generator and car locating and gating circuits, the scan reversal signals delineating zero reversals and two reversals of scan direction, the call finder not running signal to the car locating and gating circuits, the distance count signals for the distance register gating circuit, and the end of scan signal for the allotter scanner and the car locating and gating circuits.

The interlocking of the allotter and the call finder to prevent call assignment by the allotter during the hunting of the call finder and to prevent the hunting of the call finder during the operation of the allotter subsequent to the allotter scanner present is accomplished at terminals AGC-23, -22, and -13. At the initiation of a call finder-allotter operation, the registration of a call causes a "call to be found" signal to be issued as a positive signal at RCG-20. This signal is applied to ARG-23, is inverted by inverter 416 and gates OR 417. OR 417 issues a negative signal through inverters 418 and 421 to AGC-22 and RCG-41 thereby enabling the clock of the call finder ring counter. OR 417 also issues a negative signal to CLG1-47 to inhibit the allotters AND's 346 and 347 of FIG. 8 thereby preventing the assignment of a call to any demand memory. OR 417 has a latch which is released only when the allotter scanner is preset.

When the call is found by the call finder, the positive signal applied to AGC-23 is removed. However, the signal gated to inverter 418 by OR 417 is applied to AND 415 to hold that AND gated as long as no allotter preset signal is issued from ASC-39 to AGC-13. With no allotter preset signal, AGC-13 is negative and inverter 412 passes a positive signal to AND 415. AND 415, initially gated by the "call to be found" signal, remains gated until the allotter preset applies a positive signal at AGC-13. This inhibits AND 415 removing the latch it supplied to OR 417 and since the call has been found OR 417 ceases to be gated. The resulting positive signal at AGC-22 inhibits the call finder ring counter clock and enables the call assigning AND's 346 and 347.

The scanning direction currently set in the allotter scanner is imposed on AGC as a positive signal for up scan from ASC-26 to AGC-15 and a positive signal for down scan from ASC-25 to AGC-16. An up scan setting actuates OR 406 to the upper input of AND 407 and a down scan setting actuates OR 408 to the lower input of AND 409. AND's 407 and 409 each respond to a reversal of scan to actuate AND 411 upon the second scan reversal.

Upon initiation of the scan, the allotter scanner preset is released to apply a negative signal from ASC-39 to AGC-13 and inverter 412 which passes an enabling signal to AND's 413, 414 and 415. AND 415 is enabled in the latch functions for the call finder ring counter interlock with the allotter.

The release of the preset signal to AND's 413 and 414 at the beginning of the scanner clocking immediately gates that AND for the current scan direction. An ascending scanning reference direction is signified by a positive signal from ASC-42 to AGC-12 and OR 422 while a descending scanning reference direction applies a positive signal from ASC-41 to AGC-14 and OR 423. Both of AND's 413 and 414 are latched by the feedback through inverters 424 and 425, lead 426 and OR 422 for AND 413 and through inverters 427 and 428, lead 429 and OR 423 for AND 414. Upon completion of the first reversal of scan, both of AND's 413 and 414 are gated to gate AND 431. This develops an inhibition on the "zero reversal" signal through inverters 432 and 433 so that the negative "zero reversal" signal at AGC–18 is supplanted by a positive signal throughout the remainder of the scan cycle.

At the time of the first reversal of scan the inhibit on AND's 407 and 409 is removed so that that AND for the current scan direction is gated, as through OR 406 to AND 407 for an up scan or through OR 408 to AND 409 for a down scan. Once gated these AND's are latched for the remainder of the scan cycle through the inverters 434 and 435 to lead 436 and OR 406 or the inverters 437 and 438 to lead 439 and OR 408. The second reversal of scan gates the second AND of 407 and 409 to apply enabling signals to both inputs of AND 411 whereby a positive "two reversals of scan" signals appear at AGC–20. As explained above these reversal of scan signals are employed in the car locating and gating circuits to enable the car locating signal and the free car distance register drive signal.

Termination of the allotter scan is determined by the number of advancing pulses generated. For a ten landing structures eighteen advance pulses are required to complete a scan, these being composed of up calls at landings 1 to 9 and down calls at landings 2 to 10. Generally the scan can be equated to the number of landing calls to be scanned, normally the number of landings less one times two. The distance counter DC is utilized to ascertain the termination of the scan and to identify the number of landings between the call to be allotted and the car.

Pulses from the allotter scanner clock ASC–24 are applied to AGC–1 and the advance input of the first flip flop FF–1 of the five stage binary counter DC. Each pulse causes an inversion of FF–1. Similarly, the output of FF–2 represents a count of two, that of FF–3 a count of four, that of FF–4 a count of eight, and that of FF–5 a count of sixteen. These counts appear respectively at AGC–2 through AGC–6 to represent the current count of the allotter scanner and thus the number of landings scanned from the landing for which the call subject to the allotter is registered. The count is represented at any instant to the distance register gating circuits of the cars by the states of FF–1 thru FF–5. This count is used to gate on latching circuits in DRG when the car is located.

The count of eighteen, significant of a complete scan cycle in which all possible up and down stops are scanned in a ten landing structure is derived from distance counter DC through AND 441 by the coincidence of an output from FF–2 and FF–5 representative of the sum of a two count and a sixteen count. AND 441 is employed in marking the end of the allotter scan by issuing through the inverters 442 and 443 a positive signal to terminal AGC–24 and to "start ramp" and 444. The signal at AGC–24 is passed to ASC–38 to the reset circuitry in the allotter scanner imposing an inhibit on AND 214 and gating OR's 225 and 226 to activate the total stops gating. It is also passed to CLG1–4 and CLG2–4 to enable AND 343 for each car whereby the "car assigned" signal can be issued upon coincidence of the ramp signal with a service capability analog sum signal for one of the cars.

AND's 343 in the car locating and gating circuits receives a "start ramp" signal from AND 444 when none of the car locating and gating circuits are issuing a "car assigned" signal from CLG1–5 to AGC–7, CLG1–35 to AGC–8, CLG2–5 to AGC–9, and CLG2–35 to AGC–10 for cars 1 to 4 respectively, when the eighteenth scanner count gates AND 441, and when a suitably delayed signal responsive to the eighteenth count has been passed by delay circuit 445. A coincidence of these conditions causes AND 444 to gate a positive signal which is inverted to a negative signal by inverters 446, 447 and 448 and passed to AGC–11 as a "start ramp" signal for the ramp generator at ISG–23 and AND's 343 at CLG1–3.

When the coincidence between the level of the ramp generator signal and the signal from operational amplifier 371, representing the service capability of a car with respect to the call which instituted the allotter function, occurs to gate AND 343, the negative signal at that car's input to AND 444 is inverted to a positive signal. This inhibits AND 444 and terminates the ramp generator by a positive signal from AGC–11 to ISG–23.

The assignment of a landing call by the allotter results in the introduction of that call into the appropriate demand memory for the car (not shown). Each car has a set of demand memories which develop and retain signals employed in the car drive logic until the call has been answered or until the service capability of the car has been altered to a degree indicating an impairment in its ability to serve the call. The signals from demand memories are applied to the allotter in order to indicate the assignment of service requirements during the evaluation of the car's service capability. Once a demand memory is activated, it locks out operation of the call finder and allotter to subsequently registered landing calls for that landing and service direction. They are also applied to the car drive logic to control the start and stop of the car. Signals are applied to the demand memories from the call finder and the call memories to identify a call to be assigned, from the allotter to define the assignment of up and down calls, from the command memories under certain circumstances to indicate a coincidence of a car call for the landing when the car is set for the service direction of the landing call, and from the call reset gating for resetting the demand memories in response to the answering of the call by the car.

RECAPITULATION

The present invention is particularly applicable to a system for controlling a plurality of elevators serving a plurality of landings. In such a system calls registered common to the cars, as landing cars, are selected in a serial order by a call finder. An assignment for service to each selected call is developed between the call and a car favorably disposed with respect to the call. A plurality of cars are eligible for the assignment and according to the present invention the allotter simultaneously considers the service capability of each car to develop the call-car assignment between the selected call and a car having an acceptable service capability.

Service capability of the cars is gauged in terms of a number of service criteria. Each criterion for each car is separately developed and retained in counters, registers or other means from which it is converted to a common denominator, as a current level representative of the amount of delay it represents in the service of the elevator. These common based signals can be summed for each car thereby indicating a total time delay predicted for each car as a result of the service requirements imposed.

Typical service capability criteria which are related to the selected call are the travel distance of each car to the selected call, the number of stops required of the car in traveling from its current position to the selected call, or if no calls are assigned to a car, the distance between the car and the selected call. Other service criteria include the total stops required of each car and the loading of each car. These later criteria are not restricted to the service relationship to the selected call since they may represent service requirements involving travel beyond the call. Analog signals of these service capability criteria are generated as current from scaled resistances grounded through the stages of binary counters, through the gating circuits of registers and through tap switches.

Service capability has been developed for each car in the exemplary system by scanning the landing positions and service directions for those landing positions in a cyclic fashion. Scanning is initiated from the position of the landing of the selected call and in an initial scan direction toward cars approaching the call in a direction to provide rapid service. Thus if an up call is to be considered the scanner looks below the call initially by scanning downward from the landing of the call. Scanning encompasses all landing and service direction combinations by reversing at the limits of landings.

The scanning process is employed to ascertain the required travel distance from each car to the landing for which the call is registered, to ascertain the intermediate stops (those between the current car position and the landing of the call), and the free car spacing all by accumulating counts in counters. At the end of the scan the total stops are gated to a register.

Each car has a storage means for the car calls and for the assigned landing calls. The calls in these storages are considered stops in the future travel of the car.

Travel distance is the count of the number of scan positions from the landing of the call to the car. It can include scans to one or both limits of scan position so that some landings may be counted twice for the car's travel past them in both directions.

Intermediate stops are the count of the coincidence of scan position and assigned car or landing calls for the car in the region of car travel between its current position and the landing of the call. All calls can be counted by this coincidence count, although in the example the counter is inhibited when the car position-scan position coincidence occurs to limit the count to intermediate calls and thus intermediate stops.

Total stops are gated to a register at the end of the scan as the car and landing calls assigned to each car. End of scan in the example occurs when a complete scan cycle of the landings has occurred so that each terminal landing has been scanned once and each intermediate landing has been scanned twice. This type of scan is utilized in ascertaining the spacing of absolute distance of free car's from the call. If free car spacing is not employed, the scan need merely encompass all cars and can terminate at the point the last car is found.

Free car spacing is ascertained by counters which count the scan position between the call and car. Since a "free car" has no assigned calls, it can travel in either direction. Accordingly, only a count of the scan positions from the call to the car and prior to the first reversal of scan or from the car to the call and subsequent to the second reversal of scan is employed for free car counting.

These various criteria of service capability are translated to electrical current drawn from a common lead. Thus the service capability factors represented are summed as a total current drawn from each car. Further the amount of current drawn for each element of each factor is scaled to represent the time delay in service introduced by that factor. While many combinations suggest themselves within this concept, it can be considered to represent the time required for each car to answer the call under consideration if only those factors introducing delays between the car's current position and the call are considered. Thus, the concept provides predicted answer time to the call if it considers the travel distance required of the car and the intermediate stops to the call. If the factors introducing delays beyond the call are considered it would predict the service interval anticipated in completing service to the call. Such delays might be the stops beyond the call. In the example the two concepts have been combined and factors which offer no identification with service location such as car loading have been included to predict a general service interval or capability for each car.

The car best situated to serve the call is allotted the call. This optimization is based upon the shortest predicted service interval or the lowest summed current as ascertained by comparing signals developed for each car from their summed currents with a standard signal which is progressively increased until it attains the level of the signal resulting from the smallest summed current. Comparators respond to this coincidence to terminate the allotter function and gate the call storage for the optimum car and for the call which instituted the allotter operation.

The allotter may be viewed as including means to predict the service burden on the cars, the call memories, the distances between car and call, and car loading; means to predict the service capability of each car, as by translating the quantities of service burden to signals scaled to service delay time; and means to develop a service assignment between the selected call and the car having the optimum predicted service capability, by the standard signal application to the comparator to ascertain the car with the least predicted delay time.

From the above recapitulation it is evident that many of the subcombinations of this system have utility in and of themselves and might be applied to other systems. Further the concepts of simultaneously considering all cars for assignment with a call, optimizing the assignment on a predicted service capability basis, and measuring the various service factors lend themselves to many variations. Accordingly, the present disclosure is to be read only as illustrative of the invention and not in a limiting sense.

Having described the invention, we claim:

1. An elevator system comprising a plurality of elevator cars serving a plurality of landings, means for registering calls for service at said landings which can be served by any of a plurality of said cars, means for selecting a call for a landing of one of said registering means, means for ascertaining the service capability of each car, and means for simultaneously considering the service capability of each car to develop an assignment between said selected call and a car having an acceptable level of service capability.

2. A combination according to claim 1 wherein said means for ascertaining service capability are individual to each car.

3. A combination according to claim 1 wherein said means for ascertaining the service capability of each car is responsive to a criterion of service capability of each car with respect to said selected call.

4. A combination according to claim 3 wherein said criterion is the travel distance of each car to said selected call.

5. A combination according to claim 3 wherein said criterion is the number of stops assigned to said car located in the path of said car's travel between said car's current effective position and said selected call.

6. A combination according to claim 1 wherein said means for ascertaining the service capability of each car includes means to ascertain the number of stops assigned to said car by the development of assignments between said car and registered calls.

7. A combination according to claim 1 including means to assign each car having no assignment with calls registered on said registering means to a "free car status," and wherein means for ascertaining the service capability of each car includes means to ascertain the spacing between any car having a free car status and said registered call.

8. A combination according to claim 1 wherein said means for ascertaining the service capability of each car includes means to ascertain the loading of said car.

9. A combination according to claim 1 wherein said acceptable level of service capability is the optimum service capability relative to the service capability of other cars in said system.

10. A combination according to claim 1 wherein said means for ascertaining service capability include means for ascertaining a first criterion of service capability of said cars, means for ascertaining a second criterion of service capability of said cars, and means for combining said first and second service capability criteria for each car, said assignment means being responsive to said combined service capability criteria.

11. A combination according to claim 1 including means for generating a signal which is an analog of said ascertained service capability, said acceptable level of service capability being defined by the level of said analog signal.

12. A combination according to claim 1 including mean for generating an analog signal scaled to service time for said car relative to said ascertained service capability of said car, and said acceptable level of service capability in the optimum service time analog signal relative to the service time analog signals for other cars in said system.

13. An elevator system comprising a plurality of elevator cars serving a plurality of landings, means for registering calls for service at said landings which can be served by any of a plurality of said cars, means for selecting a call for a landing of one of said registering means, means for ascertaining the service capability of each car with respect to a first criterion of service capability, means for ascertaining the service capability of each car with respect to a second criterion of service capability, means for combining for each car said ascertained service capability of said first and second criteria, and means for developing an assignment between said selected call and that car of said plurality having the optimum combined service capability.

14. An elevator system comprising a plurality of elevator cars serving a plurality of landings, means for registering calls for service at said landings which can be served by any of a plurality of said cars, means for selecting a call for a landing of one of said registering means for ascertaining the travel distance for each car to said selected call, means for ascertaining the number of stops assigned to each car located in the path of said car's travel intermediate said car's current effective position and said selected call, means for ascertaining the total number of stops assigned to each car, means for ascertaining the loading imposed upon each car, means to combine as a service capability of each car said travel distance, said number of intermediate stops, said number of total stops, and said loading individual to said car, and means for developing an assignment between said selected call and that car of said plurality having the optimum combined service capability.

15. A combination according to claim 13 including means for each service ascertaining means for translating said level of service capability to a common denominator scaled to said level, said combining means combining said scaled common denominators for each car as an indicia of its overall service capability.

16. A combination according to claim 15 wherein said common denominator is service delay time introduced by said criteria and said optimum is the briefest service delay time.

17. An elevator system comprising a plurality of elevator cars serving a plurality of landings, means for registering landing calls, means for individually selecting registered landing calls, means for predicting the service burden imposed upon each car according to the service requirements imposed thereon, means for predicting the service capability of each car with respect to said selected call as a function of the predicted service burden for each car, and means for developing a service assignment between said selected call and the car having the optimum predicted service capability.

18. A combination according to claim 17 including means responsive to the absence of an assignment for a given call after completion of the prediction of service capability of said cars to serve said given call for recycling said predicted burden ascertaining means, said predicted service capability means and said assigning means.

19. A combination according to claim 17 including a timer for defining an interval from the operation of said predicted burden ascertaining means and of sufficient length to complete the operation of said service capability predicting means, and means responsive to the absence of an assignment of a given call upon definition of said interval by said timer for recycling said predicted burden ascertaining means, said predicted service capability means and said assigning means for said given call.

20. An elevator system comprising a plurality of cars serving a plurality of landings, means common to said cars for registering calls for service to said landings in a first direction, means to measure the effective distance in a direction opposite said first direction of each car from the landing of each call registered on said call means, means for generating a signal according to said effective distance, and means for developing an assignment between said registered call and said car having the optimum disposition to respond to said call, said optimum disposition including said distance as a factor.

21. In an elevator system comprising a plurality of cars serving a plurality of landings the combination for ascertaining the distance between the cars and a given landing comprising a scanning means for successively scanning landing positions corresponding to the travel of said cars, means to initiate said scanning of said scanning means from the landing position of said given landing, means for each car for defining the landing which is the effective position of said car, a counting means for each car for counting scanned landing positions, and means to inhibit said counting means for each car upon a coincidence of said landing position of said scan and of the effective position of said car.

22. A combination according to claim 21 including means to signify the service direction of each car, means to signify the direction of scan by said scanning means and wherein said inhibiting means is effective only when said scan direction is opposed to said car service direction.

23. An elevator system comprising a plurality of cars serving a plurality of landings, means to register landing calls, means to ascertain a plurality of service capability criteria for each of a plurality of said cars with respect to individual registered landing calls, means to generate a signal for each service criterion for each car at a level which is a function of said ascertained service capability of said car, and means for each car for summing said generated signals of the service criteria for said car, whereby the service capability of each car with respect to said call is ascertained.

24. An elevator system comprising a plurality of cars serving a plurality of landings, means to register landing calls, means to ascertain a plurality of service capability criteria for each of a plurality of said cars with respect to individual registered landing calls, means to generate a signal, for each service criterion for each car at a level which is a function of said ascertained service capability of said car, means for each car for summing said generated signals of the service criteria for said car, and means for developing an assignment between said individual call and the car having the summed signal level indicative of the most favorable service capability.

25. An elevator system comprising a plurality of cars serving a plurality of landings, means to register landing calls, means for each car to develop an analog signal characteristic of the service capability of said car in response to the registration of a landing call, means to generate a signal which changes in level progressively with time, a comparator for each car, means coupling said analog signal for each car and said progressively changing signal in said respective comparators in a comparative relationship, means for each car to issue a call assignment signal upon the establishing of a predetermined relationship between said progressively changing signal and one of said analog signals, and means to develop an assignment between said registered call and said car having said call assignment signal.

26. A combination according to claim 25 including first means for each car for developing an analog signal characteristic of the capability of said car to serve a registered landing call with respect to one criterion; second means for each car for developing an analog signal characteristic of the capability of said car to serve said registered landing call with respect to a second criterion, said means for developing an analog signal for each car comprising a signal summing means for summing signals from said first and second means.

27. A combination according to claim 25 wherein said means to generate said progressively changing signal produces a signal which increases in level with time, and including means to institute the generation of said increasing signal upon the completion of the development of said analog signal.

28. An elevator system having a plurality of cars serving a pair of terminal landings and a plurality of intermediate landings including first call registering means for registering up landing calls, second call means for registering down landing calls, a scanning means having a step for each landing of said system sequentially arranged to correspond to said landing, means to initiate the scan in response to an operated call registering means at the step corresponding to the landing of said call, means to initiate the scan in a direction relative to the step sequences which is opposed to the service direction of said call, means to reverse the direction of said scan when said scan steps to said step positions of said terminal landings, means to sense the effective position of each elevator car, means responsive for each car to the coincidence of the scan step position and the effective car position, and means to terminate said scan subsequent to the coincidence of said scan position with the effective position of each of said plurality of cars.

29. A combination according to claim 28 including counting means for each car, means to inhibit said counting means for each car upon coincidence of said scan step position with the effective position of said car whereby said count in each counter represents the travel of said car between said car and said scan initiating call.

30. A combination according to claim 29 including means for each car for generating an analog signal characteristic of the count in said car's counter.

31. A combination according to claim 28 wherein said means to terminate said scan is a scan step counter which causes said termination upon a number of steps corresponding to the number of landing call registering means in said system.

32. A combination according to claim 28 including means to establish an assignment between individual cars and individual landing calls, means individual to the cars to register car calls for service at said landing, means for each car responsive to the coincidence of scan steps with landings for which car calls for said car are registered and for which assignments between said car and said landing calls are established, and call counting means for each car for counting said scan step-call coincidence means responses, whereby the number of calls for each car is ascertained in said counting means.

33. A combination according to claim 28 including means to establish an assignment between individual cars and individual landing calls, means individual to the cars to register car calls for service at said landings, means for each car responsive to the coincidence of scan steps with landings for which car calls for said car are registered and for which assignments between said car and said landing calls are established, call counting means for each car for counting said scan step-call coincidence means responses, whereby the number of calls for each car is ascertained by the count in said counting means, and means to inhibit said call counting means for each car in response to said means for each car responsive to the coincidence of said scan position with the effective position of said car whereby the number of calls for each car intermediate said car and the scan initiating call is ascertained by the count in said call counter.

34. A combination according to claim 33 including means for each car for generating an analog signal characteristic of the count in said car's call counter.

35. A combination according to claim 28 including means responsive to the first reversal of scan, a counter for counting scan steps from the initiation of said scan to the response of said car position-scan position coincidence sensing means, and means to negate the count in said counter in response to a first scan reversal prior to said response of said car position-scan position coincidence sensing means, whereby the absolute distance of a car ahead of a call is indicated by the count in said counter.

36. A combination according to claim 28 wherein said scan termination occurs when all scan positions have been scanned, including means responsive to the second reversal of scan, a counter for counting the scan steps from the response of said car position-scan position coincidence sensing means to the termination of said scan, and means to inhibit said counter prior to the operation of said second scan reversal sensing means, whereby the absolute distance of a car behind a call is indicated by the count in said counter.

37. A combination according to claim 28 including means responsive to the first reversal of scan, means responsive to the second reversal of scan, a counter for counting scan steps from the initiation of said scan to the response of said car position-scan position coincidence sensing means, means to negate the count in said counter in response to a first scan reversal prior to said response of said car position-scan position coincidence sensing means, a second counter for counting scan steps from the response of said car position-scan position coincidence sensing means to the termination of said scan, and means to inhibit said second counter prior to operation of said second scan reversal sensing means, whereby the absolute distance of a car from said initiating call is indicated by the count in said counters.

38. A combination according to claim 28 including means to delay the initiation of said scanner stepping for a predetermined time interval in response to said initiating landing call, a counter, and means to reset said counter during said delay interval.

39. A combination according to claim 28 including means to establish an assignment between registered landing calls and individual cars, means individual to each car for registering car calls for service at said landings, and signal generating means for each car actuated upon termination of said scan to generate a signal proportional to the total number of the car calls registered for said car and the assignments between landing calls and said car.

40. A combination according to claim 28 including means to ascertain the loading imposed upon each car, and signal generating means for each car actuated upon termination of said scan to generate a signal proportional to the loading imposed upon said car.

41. A combination according to claim 28 including a distance counter for each car for counting the number of steps between scan initiation and the response of said scan position-car position coincidence sensing means, means individual to each car for registering car calls for said landings, means to establish an assignment between registered landing calls and individual cars, means individual to each car responsive to a coincidence of a scan position with a landing for which a car call for that car is registered and for which an assignment between a landing call and said car exists, an intermediate stops counter for each car for counting the responses of said means sensing coincidences between scan position and calls for said car, means for each car for generating a signal as a function of the count in said distance counter, means for each car for generating a signal as a function of the count in said intermediate stops counter, means for each car to generate a signal as a function of the total number of the car calls, registered for said car and the assignments between landing calls and said car, means for each car to generate a signal as a function of the loading imposed upon said car, means to sum said signals for each car, and means to establish an assignment between said initiating call and said car having the sum signal characteristic of the most favorable service capability with respect to said call.

42. In an elevator system having a plurality of cars serving a plurality of landings, means to register landing calls for up service at those landings for which up service is provided, means to register landing calls for down service at those landings for which down service is provided, scanning means having scan positions corresponding to each landing call registering means arranged in a sequence corresponding to the sequence of said landing call registering means, means responsive to a registered landing call to initiate operation of said scanning means at the scan position of said call and in a scanning direction opposed to the service direction of said call and means to continue operation of said scanning means until coincidence of said scan position is achieved with the effective position of each of said plurality of cars.

43. A combination for predicting the answer time with respect to a given landing of an elevator serving a plurality of landings comprising means for counting the number of landings to be passed by said elevator in traveling from its current position and travel direction to any intervening terminal landings and to said given landing, means to count stops assigned to the car intermediate its current position and said given landing, means equating landing count to travel time, means equating the count of intermediate stops to delay time, and means to sum said travel time and said delay time.

44. A combination according to claim 17 wherein said service capability means for each car includes means to ascertain as a first service capability factor the distance between said registered call and said car, means to ascertain the number of stops required of the car between said car and said registered call as a second service capability factor, and means to combine said first and second factors to define a level of service capability whereby said combined service capability factors are indicative of the predicted answer time of said car to said registered call.

References Cited

UNITED STATES PATENTS 3,146,858   9/1964   Leroux et al. _____ 187—29
3,379,284   4/1968   Yeasting _____ 187—29

ORIS L. RADER, Primary Examiner

W. E. DUNCANSON, Jr., Assistant Examiner

UNITED STATES PATENT OFFICE
CERTIFICATE OF CORRECTION

Patent No. 3,511,342                     Dated May 12, 1970

Inventor(s) Donivan L. Hall, William C. Susor and James P. Kuzara

It is certified that error appears in the above-identified patent and that said Letters Patent are hereby corrected as shown below:

Column 1, line 20, "citeria" should be - - criteria - - .
Column 3, line 10, "scannig" should be - - scanning - - .
Column 4, line 22, after "for" insert - - car - - .
Column 9, line 2, "be" should be - - the - - ;
        line 9, "issures" should be - - issues - - ;
        line 44, "certain" should be - - certained - - ;
        line 56, "cell" should be - - call - - .
Column 11, line 28, "scale" should be - - scaled - - .

Column 15, line 60, "staegs" should be - - stages - - .
Column 18, line 42, "down" should be - - up - - ;
        line 55, "scaning" should be - - scanning - - .
Column 19, line 15, "syuchronism" should be - - synchronism - - .
Column 20, line 9, "STG1" should be - - TSG1 - - .
Column 21, line 48, "intermedaite" should be - - intermediate - - .
Column 23, line 40, "ACS" should be - - ASC - - ;
        line 42, "ACS" should be - - ASC - - .
Column 24, line 12, "asisgnment" should be - - assignment - - .
Column 25, line 72, "untl" should be - - until - - .

Column 32, line 58, after "wherein" insert - - said - - .

Signed and sealed this 17th day of September 1974.

(SEAL)
Attest:

McCOY M. GIBSON JR.                  C. MARSHALL DANN
Attesting Officer                  Commissioner of Patents